(12) United States Patent
Araumi et al.

(10) Patent No.: US 12,374,989 B2
(45) Date of Patent: Jul. 29, 2025

(54) SWITCHING CONTROL CIRCUIT AND POWER SUPPLY CIRCUIT

(71) Applicant: FUJI ELECTRIC CO., LTD., Kawasaki (JP)

(72) Inventors: Ryuunosuke Araumi, Hino (JP); Ryuji Yamada, Hachioji (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 239 days.

(21) Appl. No.: 18/174,067

(22) Filed: Feb. 24, 2023

(65) Prior Publication Data

US 2023/0299666 A1 Sep. 21, 2023

(30) Foreign Application Priority Data

Mar. 16, 2022 (JP) .................................. 2022-041192

(51) Int. Cl.
*H02M 1/42* (2007.01)
*H02M 1/00* (2006.01)

(52) U.S. Cl.
CPC ....... *H02M 1/4225* (2013.01); *H02M 1/0058* (2021.05)

(58) Field of Classification Search
CPC .......................... H02M 1/4225; H02M 1/0058
See application file for complete search history.

(56) References Cited

U.S. PATENT DOCUMENTS

| 2011/0095733 | A1* | 4/2011 | Park | H02M 1/4225 |
| | | | | 323/207 |
| 2012/0155132 | A1* | 6/2012 | Uno | H02M 1/4225 |
| | | | | 363/80 |
| 2017/0093301 | A1 | 3/2017 | Nakano | |
| 2021/0391781 | A1* | 12/2021 | Endo | H02M 1/4208 |

FOREIGN PATENT DOCUMENTS

| JP | 2017-070192 A | 4/2017 |
| JP | 2017-077171 A | 4/2017 |
| WO | 2018/123115 A1 | 7/2018 |

* cited by examiner

*Primary Examiner* — Alex Torres-Rivera
(74) *Attorney, Agent, or Firm* — Rabin & Berdo, P.C.

(57) ABSTRACT

A switching control circuit for a power supply circuit that includes an inductor configured to receive a rectified voltage corresponding to an alternating current (AC) voltage, and a transistor configured to control a current flowing through the inductor, the power supply circuit generating an output voltage from the AC voltage, the switching control circuit being configured to switch the transistor. The switching control circuit comprises: a signal output circuit configured to output a signal to turn on the transistor, after lapse of a first time period since the inductor current reaches a first predetermined value after the transistor is turned off, the first time period corresponding to a conduction period during which a parasitic diode of the transistor conducts; and a driver circuit configured to turn on the transistor based on the signal, and turn off the transistor, based on a feedback voltage corresponding to the output voltage.

13 Claims, 21 Drawing Sheets

SWITCHING CONTROL CIRCUIT AND POWER SUPPLY CIRCUIT

CROSS-REFERENCE TO RELATED APPLICATION

The present application claims priority pursuant to 35 U.S.C. § 119 from Japanese patent application number 2022-041192 filed on Mar. 16, 2022, the entire disclosure of which is hereby incorporated by reference herein.

BACKGROUND

Technical Field

The present disclosure relates to a switching control circuit and a power supply circuit.

Description of the Related Art

As a power supply circuit, known is a power factor correction circuit (hereinafter, referred to as a power factor correction (PFC) circuit as appropriate) that turns on a transistor after a lapse of a predetermined time period corresponding to a resonant period since an inductor current has reached zero (see, for example, Japanese Patent Application Publication No. 2017-70192, WO2018/123115, Japanese Patent Application Publication No. 2017-77171).

Incidentally, when an input voltage to a power supply circuit is low, a parasitic diode of a transistor may conduct after the inductor current reaches zero. In this case, a switching control circuit that turns on the transistor based on the resonant period may not be able to appropriately reduce switching loss.

SUMMARY

A first aspect of an embodiment of the present disclosure is to provide a switching control circuit for a power supply circuit that includes an inductor configured to receive a rectified voltage corresponding to an alternating current (AC) voltage, and a transistor configured to control an inductor current flowing through the inductor, the power supply circuit being configured to generate an output voltage of a target level from the AC voltage, the switching control circuit being configured to switch the transistor. The switching control circuit comprises: a signal output circuit configured to output a signal to turn on the transistor, after lapse of a first time period since the inductor current reaches a first predetermined value after the transistor is turned off, the first time period corresponding to a conduction period during which a parasitic diode of the transistor conducts; and a driver circuit configured to turn on the transistor, based on the signal outputted from the signal output circuit, and turn off the transistor, based on a feedback voltage corresponding to the output voltage.

A second aspect of an embodiment of the present disclosure is to provide a power supply circuit configured to generate an output voltage of a target level from an alternating current (AC) voltage, the power supply circuit comprising: an inductor configured to receive a rectified voltage corresponding to the AC voltage; a transistor configured to control an inductor current flowing through the inductor; and a switching control circuit configured to switch the transistor. The switching control circuit includes a signal output circuit configured to output a signal to turn on the transistor, after lapse of a first time period since the inductor current reaches a first predetermined value after the transistor is turned off, the first time period corresponding to a conduction period during which a parasitic diode of the transistor conducts; and a driver circuit configured to turn on the transistor, based on the signal outputted from the signal output circuit, and turn off the transistor, based on a feedback voltage corresponding to the output voltage.

The above summary does not list all of the features of the present disclosure. Subcombinations of these feature groups may also be the disclosure.

DETAILED DESCRIPTION

Hereinafter, the present disclosure will be described through embodiments of the disclosure. However, the following embodiments do not limit the disclosure according to the scope of the claims. In addition, not all the combinations of the features described in the embodiments are necessarily essential for solution in the disclosure.

Herein, when the term "couple" is used, it means to "electrically couple" unless otherwise noted. Herein, a state where the logic level of a voltage or a signal is a high (High) level will be referred to as "high or high level", and a state where the logic level is a low (Low) level will be referred to as "low or low level".

Figure 1:
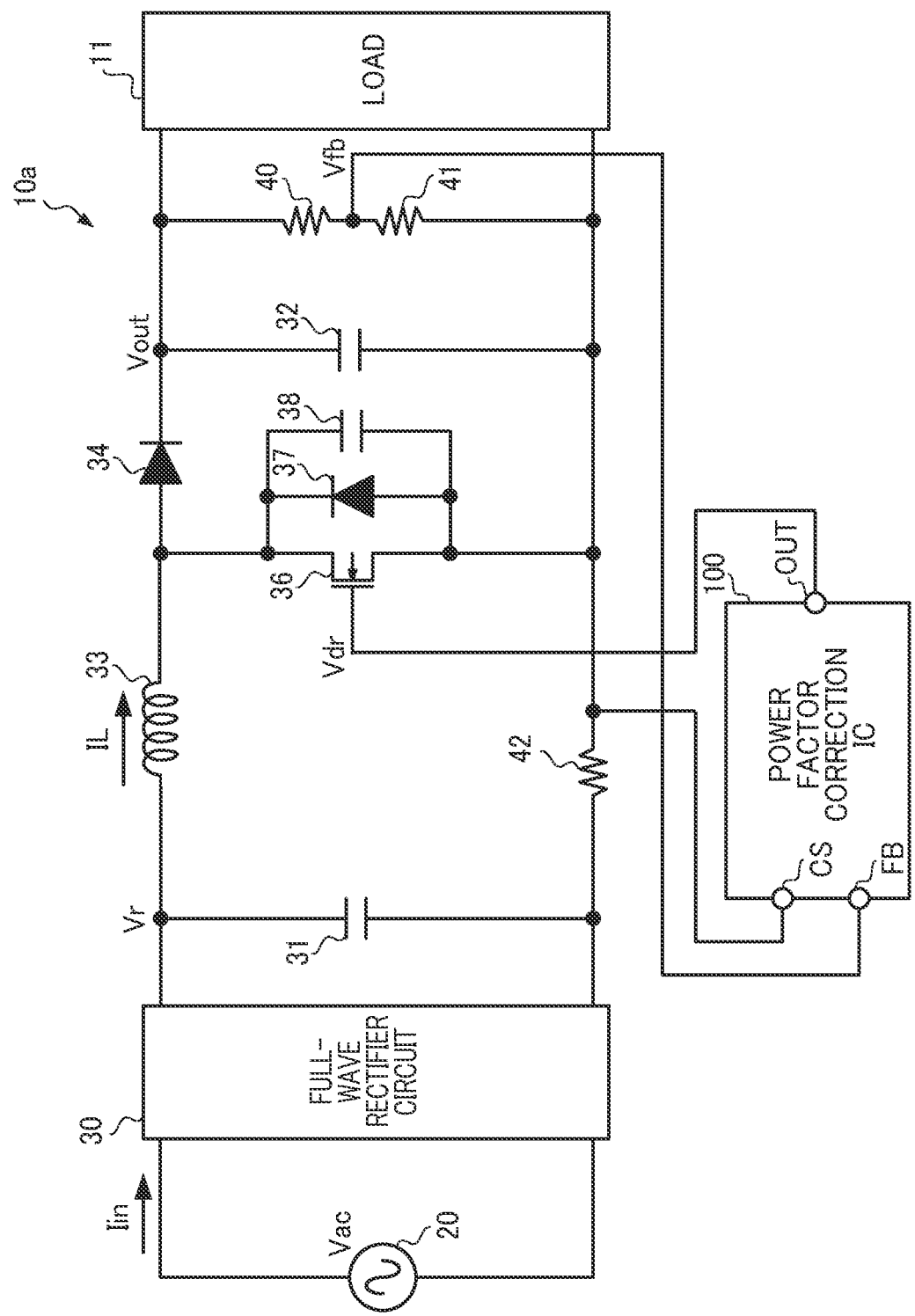
FIG. 1 illustrates an example of a circuit diagram of a typical AC-DC converter 10*a*.

FIG. 1 illustrates an example of a circuit diagram of a typical AC-DC converter 10a. The AC-DC converter 10a is a boost power factor correction (PFC) circuit that generates an output voltage Vout of a target level from an alternating current (AC) voltage Vac of a commercial power supply. The output voltage Vout generated by the AC-DC converter 10a is used to drive a load 11.

The load 11 includes a DC-DC converter and an electronic device that operates on direct current (DC) voltage, for example.

<<Configuration of AC-DC Converter 10a>>

The AC-DC converter 10a includes a full-wave rectifier circuit 30, capacitors 31, 32, an inductor 33, a diode 34, a power factor correction integrated circuit (IC) 100, an N-channel metal-oxide-semiconductor (NMOS) transistor 36, and resistors 40 to 42. Further, the NMOS transistor 36 according to an embodiment of the present disclosure includes a body diode 37 and a parasitic capacitor 38 as parasitic elements.

===Input to Full-Wave Rectifier Circuit 30===

An alternating current (AC) power supply 20 is a commercial AC power supply for supplying the AC voltage Vac to the full-wave rectifier circuit 30. The AC voltage Vac is a voltage in a range of from 100 to 277 V with a frequency in a range of from 50 to 60 Hz, for example.

===Configuration from Full-Wave Rectifier Circuit 30 to Load 11===

The full-wave rectifier circuit 30 performs full-wave rectification of the predetermined AC voltage Vac inputted thereto, to thereby output a resultant voltage to the capacitor 31 and the inductor 33 as a rectified voltage Vr. The rectified voltage Vr corresponding to the AC voltage Vac is applied to the inductor 33.

The capacitor 31 smooths the rectified voltage Vr supplied from the full-wave rectifier circuit 30

The capacitor 32 configures a boost chopper circuit, together with the inductor 33, the diode 34, and the NMOS transistor 36. This boosts the charge voltage of the capacitor 32 to the DC output voltage Vout, to supply a resultant voltage to the load 11.

The power factor correction IC 100 is an integrated circuit that controls switching of the NMOS transistor 36 such that the output voltage Vout reaches a target level (e.g., 400V) while improving the power factor of the AC-DC converter 10a.

The power factor correction IC 100 has terminals FB, CS, OUT. Note that the power factor correction IC 100 has terminals other than the above three terminals FB, CS, OUT, however, they are omitted for convenience.

It is assumed, in an embodiment of the present disclosure, that the NMOS transistor 36 is used as a switching device (so-called power transistor) used for power conversion, however, the present disclosure is not limited thereto. For example, a transistor such as a P-type transistor, a bipolar transistor or the like may be used as the switching device.

The gate electrode of the NMOS transistor 36 is coupled to the terminal OUT, and a voltage Vdr from the power factor correction IC 100 is applied to the terminal OUT. As described above, the NMOS transistor 36 includes the body diode 37 as a parasitic element and the parasitic capacitor 38.

The body diode 37 is a diode formed by drain-source pn junction of the NMOS transistor 36, and is a parasitic diode.

The parasitic capacitor 38 is a parasitic capacitance between the drain and the source of the NMOS transistor 36. In the AC-DC converter 10a, a parasitic capacitance that resonates with an inductance L of the inductor 33 exists in the circuit, when the NMOS transistor 36 is turned off. The parasitic capacitor 38 is an example of a main parasitic capacitance that resonates with the inductance L of the inductor 33.

However, each of the diode and the capacitor coupled to the NMOS transistor 36 is not limited to a parasitic element. Specifically, in place of the body diode 37, a diode whose anode and cathode coupled in anti-parallel with the drain and the source of the NMOS transistor 36 may be used. Similarly, in place of the parasitic capacitor 38, a capacitor may be coupled in parallel with the NMOS transistor 36.

Note that, in this case, the diode coupled to the NMOS transistor 36 may include a diode that is on during the same time period as a time period Ta (described later) during which the conduction phenomenon of the body diode 37 occurs.

The resistors 40, 41 configure a voltage divider circuit that generates a voltage Vfb obtained by dividing the output voltage Vout. The voltage divider circuit configured with the resistors 40, 41 applies the voltage Vfb to the terminal FB of the power factor correction IC 100 as a feedback voltage.

The resistor 42 is a resistor to detect an inductor current IL. A voltage Vcs corresponding to the inductor current IL is generated at the resistor 42. One end of the resistor 42 is coupled to the terminal CS of the power factor correction IC 100.

The power factor correction IC 100 is a typical integrated circuit that controls the AC-DC converter 10a. The power factor correction IC 100 turns on the NMOS transistor 36, after a lapse of a predetermined time period since the inductor current IL has reached zero based on the voltage Vcs. In this event, the on period of the NMOS transistor 36 is determined based on the voltage Vfb applied to the terminal FB.

<<Current when NMOS Transistor 36 is Turned Off>>

==When Rectified Voltage Vr is Higher than ½ Times Output Voltage Vout==

Figure 2:
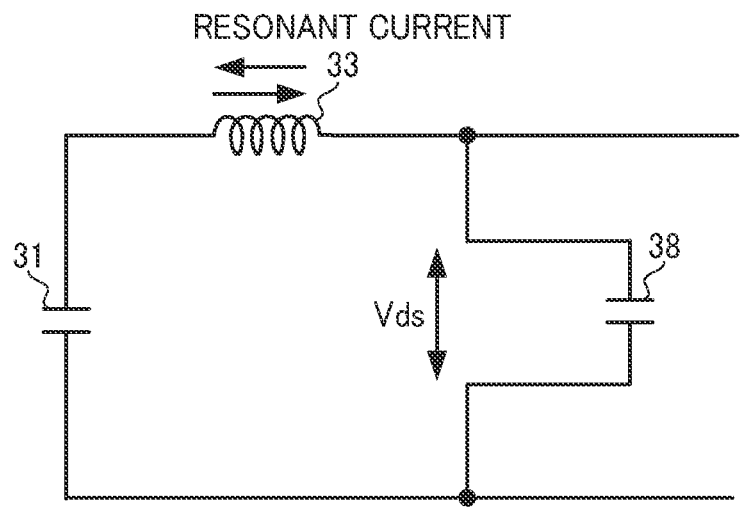
FIG. 2 illustrates an example of a resonant current flowing through an inductor 33 and a parasitic capacitor 38 in an AC-DC converter 10*a*.
Figure 3:
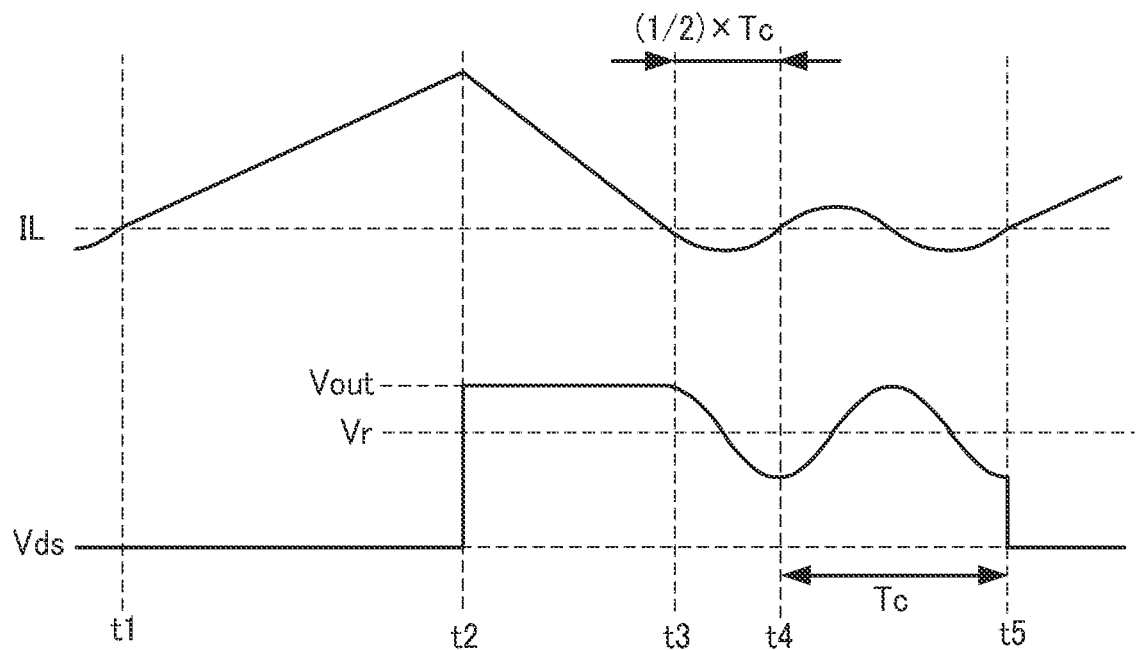
FIG. 3 illustrates an example of waveforms of main current and voltage in an AC-DC converter 10*a* when a rectified voltage Vr is higher than ½ times an output voltage Vout.

Incidentally, when the rectified voltage Vr is higher than ½ times the output voltage Vout, a resonant current according to the inductor 33 and the parasitic capacitor 38 flows, as illustrated in FIGS. 2 and 3, upon turning off of the NMOS transistor 36.

FIG. 2 illustrates an example of a resonant current flowing through the inductor 33 and the parasitic capacitor 38 in the AC-DC converter 10a.

Although the details will be described with reference to FIG. 3, due to the influence of a resonance phenomenon, a drain-source voltage Vds of the NMOS transistor 36 oscillates in a sine wave manner with the output voltage Vout as the maximum value thereof. The amplitude of the oscillation of the voltage Vds is determined as Vout−Vr, based on the output voltage Vout and the rectified voltage Vr.

FIG. 3 illustrates an example of waveforms of main current and voltage in the AC-DC converter 10a when the resonant current of FIG. 2 flows (when the rectified voltage Vr is higher than ½ times the output voltage Vout).

At time t1, the power factor correction IC 100 applies the high-level voltage Vdr to the gate electrode of the NMOS transistor 36. In association therewith, the inductor current IL starts increasing.

In the drawing, "the inductor current IL in the positive direction" refers to the current flowing in the direction from one end of the inductor 33 at which the full-wave rectifier circuit 30 and the inductor 33 are coupled, to the other end thereof at which the inductor 33 and the NMOS transistor 36 are coupled. Further, "the inductor current IL in the negative direction" refers to the current flowing in the direction from the other end of the inductor 33 to the one end thereof.

At time t2, the power factor correction IC 100 changes the voltage Vdr to low. In response to the NMOS transistor 36 being turned off, the inductor current IL decreases and the voltage Vds rises toward the voltage Vout.

At time t3, the inductor current reaches substantially zero (hereinafter, the wording "substantially zero" is simply referred to as "zero" as appropriate). In response to the inductor current decreasing, the effect of resonance caused by the inductance L of the inductor 33 and a capacitance C coupled in series with the inductor 33 appears.

Note that, here, the "capacitance C" includes not only the parasitic capacitor 38 but also the capacitance of wiring and the like coupled in series with the inductor 33, however, hereinafter, a description will be given assuming that the "capacitance C" is the capacitance of the parasitic capacitor 38, for convenience.

In the time period from time t3 to time t4, the inductor current IL indicates the minimum value, and reaches zero again at time t4. Further, due to the resonance, the voltage Vds also oscillates with twice the amplitude Vout−Vr. Time t4 is the time at which a half period of the resonance has elapsed since time t3.

At time t5, one period of the resonance has elapsed since time t4. In the time period from time t4 to time t5, the voltage Vds indicates the maximum value, and indicates the minimum value (bottom) again at time t5. Thereafter, the operation that is the same as the operation from time t1 is repeated.

As such, when the rectified voltage Vr is higher than ½ times the output voltage Vout, the voltage Vds of the NMOS transistor 36 varies in a range of positive values. In this range, the body diode 37 of the NMOS transistor 36 is not turned on.

The resonant operation in the drawing occurs between the inductor 33 and the parasitic capacitor 38. In this case, this resonant period is given by Tc=π×√(LC), where L is the inductance of the inductor 33 and C is the capacitance of the parasitic capacitor 38.

==When Rectified Voltage Vr is Lower than ½ Times Output Voltage Vout==

Figure 4:
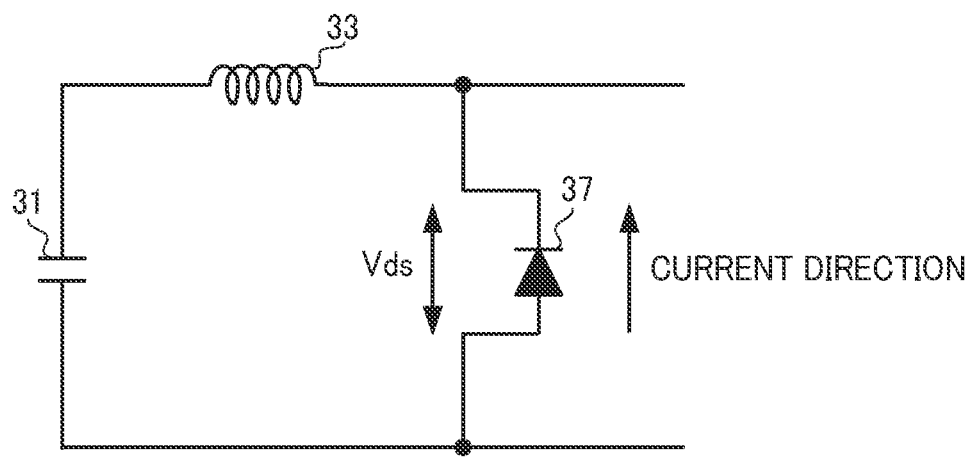
FIG. 4 illustrates an example of a current flowing through a parasitic diode in an AC-DC converter 10*a*.
Figure 5:
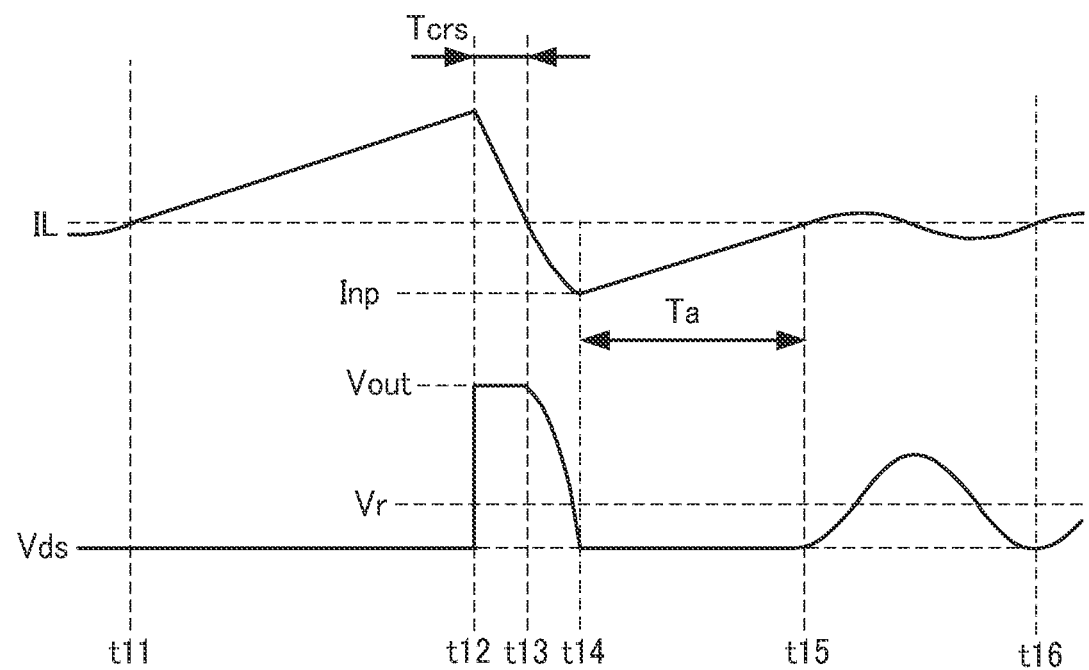
FIG. 5 illustrates an example of waveforms of main current and voltage in the AC-DC converter 10*a* when a rectified voltage Vr is lower than ½ times an output voltage Vout.

When the rectified voltage Vr is lower than ½ times the output voltage Vout, the body diode 37 conducts after the resonant current flows, as illustrated in FIGS. 4 and 5, upon turning off of the NMOS transistor 36.

FIG. 4 illustrates an example of the current flowing through the parasitic diode in the AC-DC converter 10a. When the rectified voltage Vr becomes lower than ½ times the output voltage Vout, the voltage Vds of the NMOS transistor 36 becomes equal to or lower than zero, due to the resonance phenomenon in FIG. 5, which will be described later.

FIG. 5 illustrates an example of waveforms of main current and voltage in the AC-DC converter 10a when the rectified voltage Vr is lower than ½ times the output voltage Vout. The drawing illustrates the case where the rectified voltage Vr is lower than ½ times the output voltage Vout.

Here, the operation of the AC-DC converter 10a in FIG. 1 in the time period of from when the NMOS transistor 36 is turned on to when the inductor current IL reaches zero (from time t11 to time t13) is the same as the operation from time t1 to t3 in FIG. 3.

However, FIG. 5 illustrates an example in which the rectified voltage Vr is lower than ½ times the output voltage Vout and the maximum value of the inductor current IL is smaller than that in the case of FIG. 3. Accordingly, the magnitude of the inductor current IL at time t12 is smaller than the magnitude of the inductor current IL at time t2 in FIG. 3.

A time period from time t12 at which the NMOS transistor 36 is turned off to time t13 at which the inductor current IL reaches zero is referred to as time period Tcrs. Since the maximum value of the inductor current IL is small, the time period Tcrs is shorter than the time period from time t2 at which the NMOS transistor 36 is turned off to time t3 at which the inductor current IL reaches zero in FIG. 3.

In response to the inductor current reaching substantially zero (e.g., several mA), the effect of resonance caused by the inductance L of the inductor 33 and the parasitic capacitor 38 appears, and the inductor current IL decreases and the voltage Vds also decreases during a time period from time t13 to time t14.

At time t14, the inductor current IL reaches a negative peak value Inp. In addition, at time t14, the voltage Vds becomes equal to or smaller than zero, and is lower than the forward voltage of the body diode 37. Accordingly, the voltage Vds will not drop below the forward voltage of the body diode 37. Note that, as compared with the voltage Vout, the absolute value of the forward voltage of the body diode 37 is small, and thus the voltage Vds at time t14 in the drawing is given as zero, for convenience. In response to the body diode 37 conducting, the inductor current IL rises form the peak Inp.

At time t15, similarly to the operation from time t4 in FIG. 3, the inductor current IL resonates with the inductance L of the inductor 33 and the parasitic capacitor 38. The voltage Vds of the NMOS transistor 36 rises from the forward voltage of the body diode 37, and performs resonant operation with an amplitude of Vout−Vr.

At time t16 at which a resonant period Tc has elapsed since time t15, the inductor current IL indicates zero, and the voltage Vds indicates zero.

The operation from time t16 is the same as the operation from time t11. As such, when the rectified voltage Vr is lower than ½ times the output voltage Vout, the body diode 37 of the NMOS transistor 36 is turned on.

Accordingly, in the AC-DC converter 10a, the current flowing after the NMOS transistor 36 is turned off varies depending on whether the rectified voltage Vr is higher than ½ times the output voltage Vout or the rectified voltage Vr is lower than that, as illustrated in FIGS. 3 and 5.

The typical power factor correction IC 100 turns on the NMOS transistor 36 after a lapse of a predetermined time period corresponding to the resonant period since the inductor current IL has reached zero, for example. Accordingly, the power factor correction IC 100 as such has an issue of being unable to turn on the NMOS transistor 36 at a desired timing, when the rectified voltage Vr is lower than ½ times the output voltage Vout and the body diode 37 is turned on.

Thus, to turn on the NMOS transistor 36 at the appropriate timing, it is needed to determine whether such a resonance phenomenon as illustrated in FIGS. 2 and 3 occurs, or such a phenomenon as illustrated in FIGS. 4 and 5 that the body diode 37 is turned on (hereinafter, referred to as "conduction phenomenon") occurs, after the NMOS transistor 36 is turned off. The following describes determination principles on these phenomena.

===Determination Principles===
(Determination Principle 1)

As described above, whether the voltage Vr is smaller than ½ the voltage Vout, in other words, whether the resonance phenomenon occurs or the conduction phenomenon occurs can be determined by whether $$Vr<(½)×Vout \quad (1)$$

is satisfied. Note that such a determination can be implemented, by providing a terminal for detecting the voltage that is based on the rectified voltage Vr to a power factor correction IC (described later), in addition to the terminal FB, for example.

(Determination Principle 2)

Further, the time period Tcrs in FIG. 5, Ton, and the voltages Vout, Vr satisfy $$Vr×Ton=(Vout−Vr)×Tcrs \quad (2),$$

where Ton is a time period during which the NMOS transistor 36 is on.

By transforming this expression, $$Vr/Vout=Tcrs/(Ton+Tcrs) \quad (3)$$

is given. Accordingly, when Expression (2) holds, Expression (1) is equivalent to $$Tcrs/(Ton+Tcrs)<½ \quad (4).$$

Accordingly, it is possible to determine whether the resonance phenomenon occurs or the conduction phenomenon occurs, based on the time period given in Expression (4). Note that the details of a power factor correction IC that performs such a determination will be described later.

Note that the time period Ton corresponds to an "on period", and the value ½ in Expression (4) corresponds to a "second predetermined value".

(Determination Principle 3)

Next, the expression satisfied by the conduction period Ta of the body diode 37 from when the body diode 37 conducts to when the inductor current IL reaches zero will be described. First, the negative peak value Inp indicated by the inductor current IL satisfies:

$$Inp=\sqrt{(C/L)}×(Vout−Vr) \quad (5).$$

Accordingly, the time period Ta is given by $$Ta=(Inp×L)/Vr \quad (6),$$

and by substituting the expression (1), $$Ta = \sqrt{(LC) \times [V\text{out} - Vr]/Vr} \quad (7)$$
$$= (Tc/2\pi) \times [(V\text{out} - Vr)/Vr]$$

is satisfied.

Accordingly, Expression (1) is satisfied when the time period of from when the inductor current IL becomes negative to when it reaches zero becomes longer than Tc/2π. Accordingly, in this case, $$(¼)Tc+Ta>[(\pi+2)/4\pi]×Tc \quad (8).$$

Accordingly, by continuing to calculate the time period Ta, it is possible to determine whether the resonance phenomenon occurs or the conduction phenomenon occurs, based on Expression (7). Note that the details of a power factor correction IC that performs such a determination will be described later.

Here, a description has been given of Determination principle 1 to Determination principle 3. It is preferable to turn on the NMOS transistor 36 at the timing considering the time period Ta, in the case where the conduction phenomenon occurs after the NMOS transistor 36 is turned off. The following describes principles of calculation of the time period Ta.

(Calculation Principle 1)

With terminals to receive voltages corresponding to the output voltage Vout, the rectified voltage Vr, and the voltage corresponding to the resonant period Tc being provided to a power factor correction circuit, the time period Ta in Expression (7) can be calculated.

(Calculation Principle 2)

In calculation principle 2, it is described that the time period Ta can be calculated from the time period Ton and the time period Tcrs, which is a time period of from when the NMOS transistor 36 is turned off to when the inductor current IL reaches zero, without directly measuring the voltage Vr. Here, the time periods Ton, Tcrs, the voltage Vout, and the voltage Vr satisfy Expression (2).

By substituting Expression (2) into Expression (7), it is indicated that the time period Ta satisfies $$Ta=(Tc/2\pi)×(Tcrs/Ton) \quad (9).$$

Example of AC-DC Converter 10b According to Embodiment

<<Configuration of AC-DC Converter 10b>>

Figure 6:
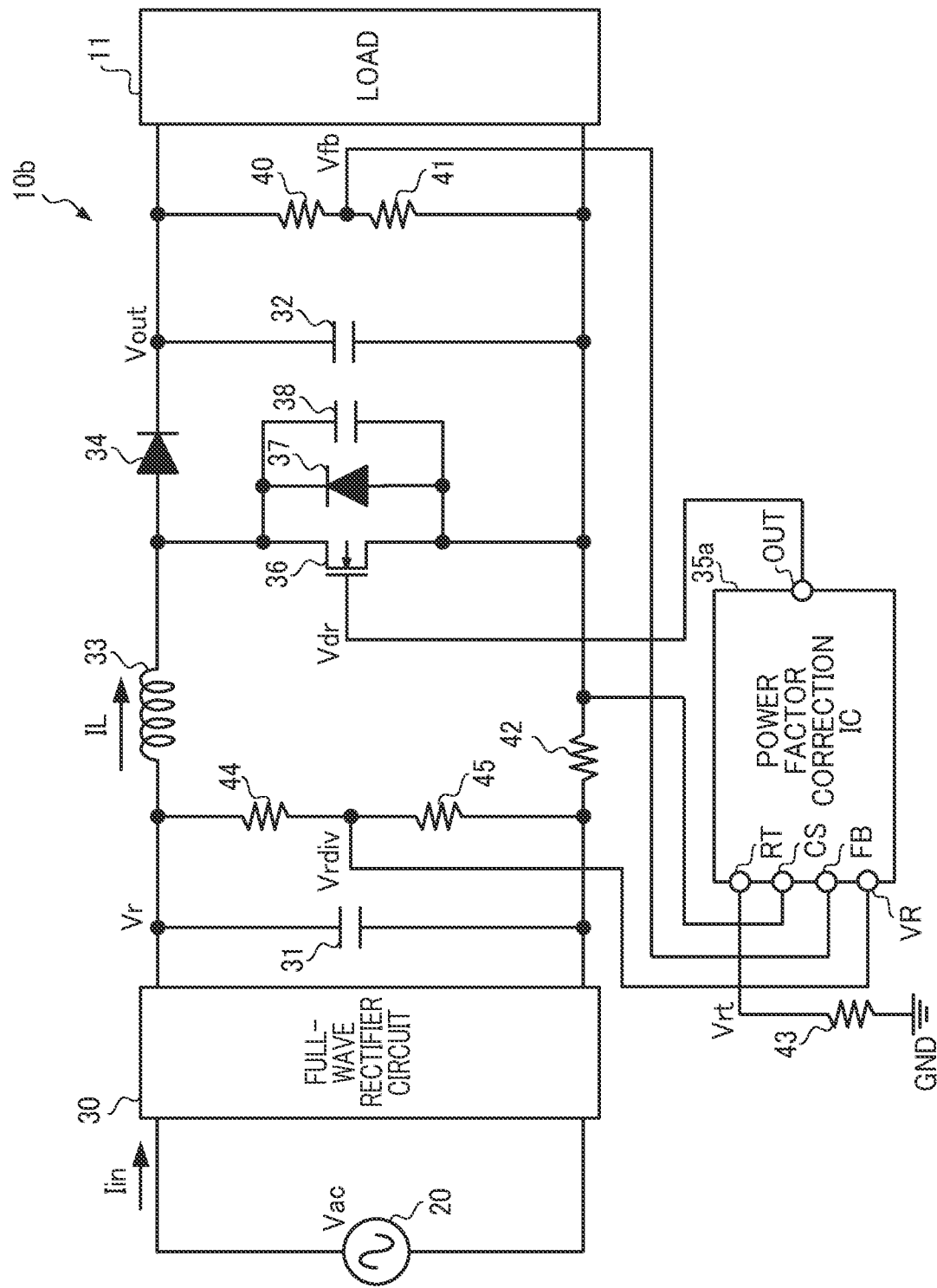
FIG. 6 illustrates an example of an AC-DC converter 10*b* according to an embodiment.

FIG. 6 illustrates an example of a circuit diagram of an AC-DC converter 10b according to an embodiment. The AC-DC converter 10a is a power supply circuit capable of addressing both the resonance phenomenon and the conduction phenomenon, and includes the full-wave rectifier circuit 30, the capacitors 31, 32, the inductor 33, the diode 34, a power factor correction IC 35a, the NMOS transistor 36, the resistors 40 to 42, and resistors 43 to 45.

Here, the parts or elements that are the same as those illustrated in FIG. 1 are given the same reference numerals. The AC-DC converter 10b is different from the AC-DC converter 10a in including the resistors 43 to 45 and the power factor correction IC 35a.

The power factor correction IC 35a is an integrated circuit capable of addressing both the resonance phenomenon and the conduction phenomenon, and has terminals RT, VR in addition to the terminals CS, FB, OUT.

The resistor 43 has one end coupled to the terminal RT and the other end that is grounded. A voltage Vrt generated at the resistor 43 is applied to the terminal RT. In an embodiment of the present disclosure, the resistor 43 has a resistance value having a magnitude corresponding to the resonant period Tc.

The resistor 44 has one end coupled to a node between the capacitor 31 and the inductor 33, and the other end coupled to the resistor 45. Accordingly, the resistors 44, configure a voltage divider circuit to divide the rectified voltage Vr. A voltage Vrdiv obtained by dividing the rectified voltage Vr is applied to the terminal VR.

Accordingly, it is possible to detect the rectified voltage Vr and the voltage corresponding to the resonant period Tc using the terminals RT, VR. The power factor correction IC 35a can calculate the conduction period of the body diode 37, based on Determination principle 1 and Calculation principle 1 as will be described below.

Note that the AC-DC converter 10b corresponds to a "power supply circuit". The power factor correction IC 35a corresponds to a "switching control circuit".

===Configuration of Power Factor Correction IC 35a==

Figure 7:
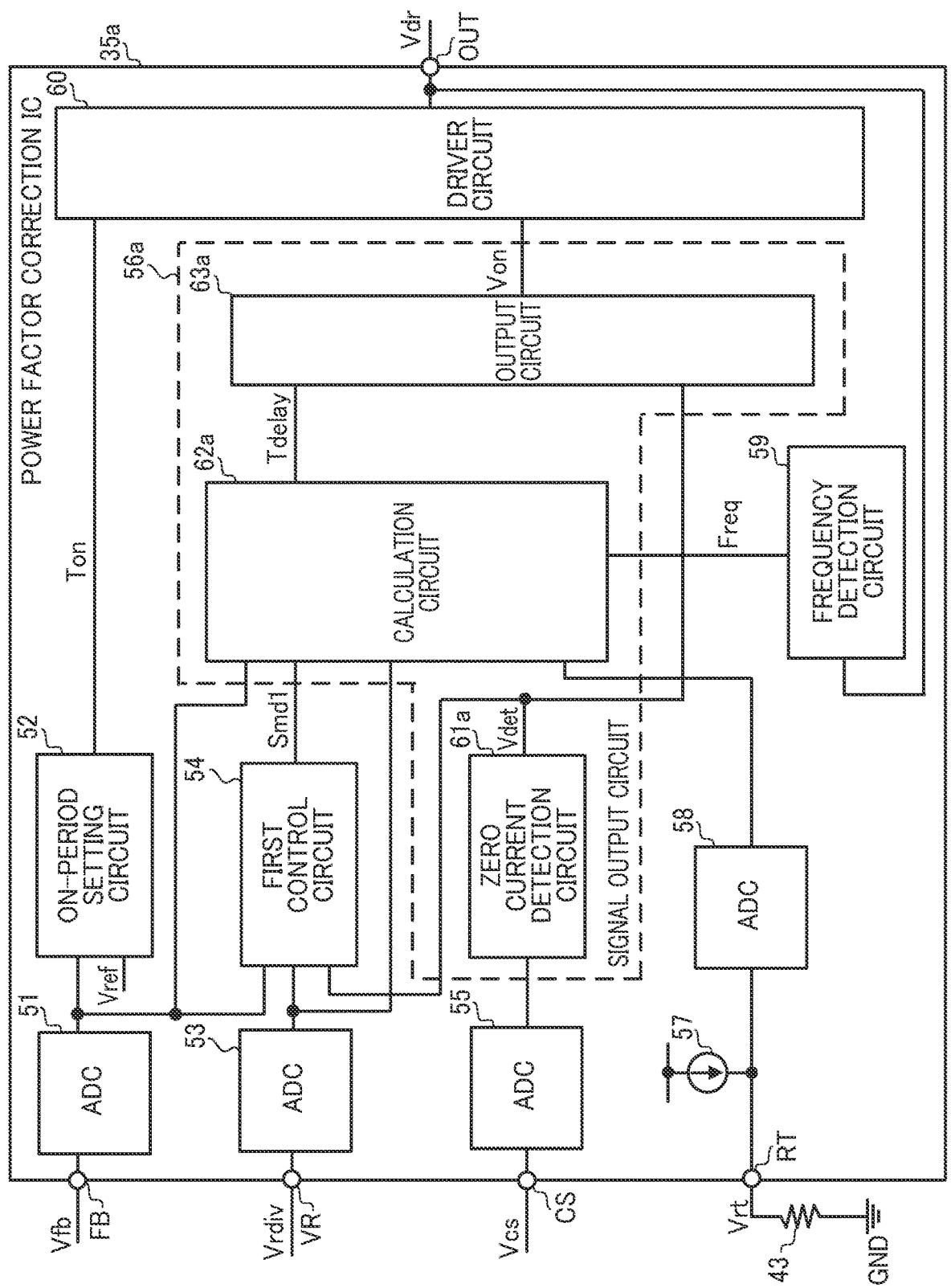
FIG. 7 illustrates an example of a configuration of a power factor correction IC 35*a*.

FIG. 7 illustrates an example of a configuration of the power factor correction IC 35a. The power factor correction IC 35a includes analog-to-digital converters (ADCs) 51, 53, 55, 58, an on period setting circuit 52, a first control circuit 54, a signal output circuit 56a, a current source 57, a frequency detection circuit 59, and a driver circuit 60. Note that, in FIG. 7, the terminals are illustrated at positions different from the positions in FIG. 6, however, wiring, element(s), and the like coupled to each of the terminals are the same as those in FIG. 6.

The ADCs 51, 53, 55, 58 convert the voltages Vfb, Vr, Vcs, Vrt applied to the terminal FB, VR, CS, RT into digital values, respectively. Hereinafter, a description will be given assuming that the digital values outputted from the ADCs 51, 53, 55, 58 are the voltages Vfb, Vr, Vcs, Vrt, respectively, for convenience.

The on period setting circuit 52 is a circuit corresponding to a so-called error amplifier circuit, and outputs data on the on period Ton to the driver circuit 60, based on an error between the voltage Vfb and a reference voltage Vref. Note that, in drawings, data on the time period Ton is given as Ton, for convenience of illustration.

The first control circuit 54 determines whether the voltage Vr is larger than ½ times the voltage Vout, based on the voltage Vrdiv and the voltage Vfb, to thereby control whether a calculation circuit 62a, described later, is to be operated in a first mode or a second mode. Specifically, if Vr<½Vout, the first control circuit 54 transmits a signal Smd1 to operate the calculation circuit 62a in the first mode, assuming that the conduction phenomenon of the body diode 37 occurs, and if Vr≥½Vout, the first control circuit 54 transmits the signal Smd1 to operate the calculation circuit 62a in the second mode, assuming that the resonance phenomenon occurs. Note that whether to operate the calculation circuit 62a in the first mode or the second mode, if Vr=(½)×Vout is satisfied, may be determined according to a design.

The signal output circuit 56a outputs a signal Von to turn on the NMOS transistor 36, after a lapse of a predetermined time period Tdelay since the inductor current IL has become equal to or smaller than a predetermined current value I0 (e.g., several mA), which is slightly larger than zero. A specific configuration of the signal output circuit 56a will be described later.

The current source 57 passes a predetermined constant current to the resistor 43 through the terminal RT. By setting the resistance value of the resistor 43 to the resistance having the magnitude determined by the resonant period Tc of the parasitic capacitor 38 and the inductor 33, the voltage Vrt having a magnitude corresponding to the resonant period Tc is generated at the terminal RT.

The frequency detection circuit 59 detects a switching frequency Freq of the NMOS transistor 36, based on the timing of a change in the level of the voltage Vdr outputted by the driver circuit 60. The frequency detection circuit 59 outputs data on the switching frequency Freq.

The driver circuit 60 changes the level of the voltage Vdr to be applied to the gate electrode of the NMOS transistor 36, based on the signal Von outputted by an output circuit 63 and the time period Ton. Specifically, the driver circuit 60 determines the timing at which the voltage Vdr is changed to high, based on the signal Von outputted by the signal output circuit 56, and causes the NMOS transistor 36 to be on during the time period Ton.

===Details of Signal Output Circuit 56a===

The signal output circuit 56a includes a zero current detection circuit 61a, the calculation circuit 62a, and an output circuit 63a. The zero current detection circuit 61a detects that the inductor current IL is substantially zero and outputs a signal Vdet, in response to the inductor current IL becoming equal to or smaller than the predetermined current value I0 (e.g., several mA), which is slightly larger than zero, based on the voltage Vcs.

The calculation circuit 62a calculates the time period Tdelay which is a time period until when the output circuit 63a outputs the signal Von to turn on the NMOS transistor 36, according to the first mode or the second mode specified by the first control circuit 54.

Note that the calculation of the time period Tdelay by the calculation circuit 62a is performed every predetermined period sufficiently shorter than each period with which the inductor current IL, the rectified voltage Vr, the output voltage Vout, or the like changes. Here, with respect to the "predetermined period" with which the calculation circuit 62a performs calculation, the calculation circuit 62a is set so as to perform calculation, for example, every period equivalent to the switching period (a period corresponding to a threshold value fth with respect to a switching frequency described later. For example, every 1/fth).

However, the calculation circuit 62a may perform calculation every time the zero current detection circuit 61a detect that the inductor current IL has reached substantially zero. In this case, the zero current detection circuit 61a outputs the signal Vdet to the calculation circuit 62a as well.

Note that the frequency with which the calculation circuit 62a calculates the time period Tdelay only has to be sufficiently shorter than each period with which the rectified voltage Vr, the output voltage Vout, or the like changes. In other words, the frequency of calculation may be the frequency with a period longer than the time period of 1/fth, when changes in the rectified voltage Vr and the output voltage Vout are small.

The output circuit 63a outputs the signal Von to turn on the NMOS transistor 36 at the timing based on the time period Tdelay, in response to the signal Vdet.

The zero current detection circuit 61a corresponds to a "detection circuit".

===Process to be Performed by Calculation Circuit 62a===

Figure 8:
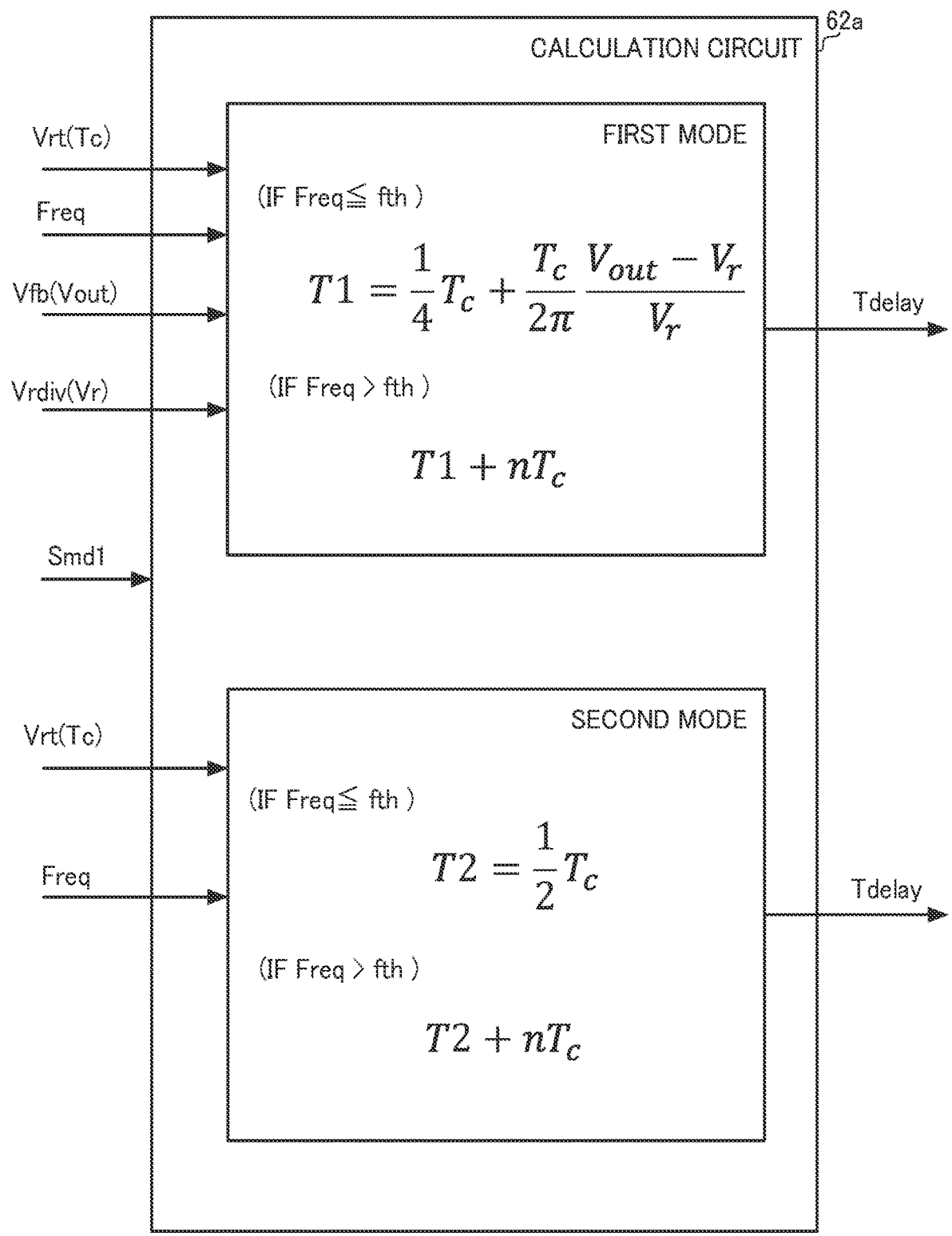
FIG. 8 illustrates an example of a process to be performed by a calculation circuit 62*a*.

FIG. 8 illustrates an example of a process to be performed by the calculation circuit 62a. Which mode the calculation circuit 62a operates in is selected based on the signal Smd1 from the first control circuit 54.

When the switching frequency Freq is equal to or smaller than the predetermined threshold value fth (e.g., 200 kHz) in the first mode, the calculation circuit 62a sets the result of the calculation of the time period Tdelay to $$a \text{ time period } T1=(\tfrac{1}{4})\times Tc+(Tc/2\pi)\times[(Vout-Vr)/Vr] \quad (10).$$

Meanwhile, when the switching frequency Freq exceeds the predetermined threshold value fth, the calculation circuit 62a sets the result of the calculation of the time period Tdelay to T1+nTc (n is a natural number).

As the switching frequency Freq rises, the power loss due to switching increases. To reduce the switching loss, the time period Tdelay is increased and the switching frequency is reduced. The magnitude of the natural number n is preset such that the frequency Freq will reach the predetermined threshold value fth. Accordingly, the switching frequency Freq can be maintained equal to or smaller than the predetermined threshold value fth.

Further, when the switching frequency Freq is equal to or smaller than the predetermined threshold value fth, in the second mode, the calculation circuit 62a sets the result of the calculation of the time period Tdelay to $$a \text{ time period } T2=(\tfrac{1}{2}) \times Tc \tag{11}.$$

Furthermore, when the switching frequency Freq exceeds the predetermined threshold value fth, the calculation circuit 62a sets the result of the calculation of the time period Tdelay to T2+nTc (n is a natural number). The magnitude of the natural number n is preset such that the frequency Freq is the predetermined threshold value fth in both the case where the time period Tdelay is T1+nTc and the case where the time period Tdelay is T2+nTc. This makes it possible to increase the time period Tdelay longer, and maintain the switching frequency Freq equal to or smaller than the predetermined threshold value fth.

Note that the threshold value fth corresponds to a "third predetermined value".

===Operation Flow of Power Factor Correction IC 35a===

Figure 9:
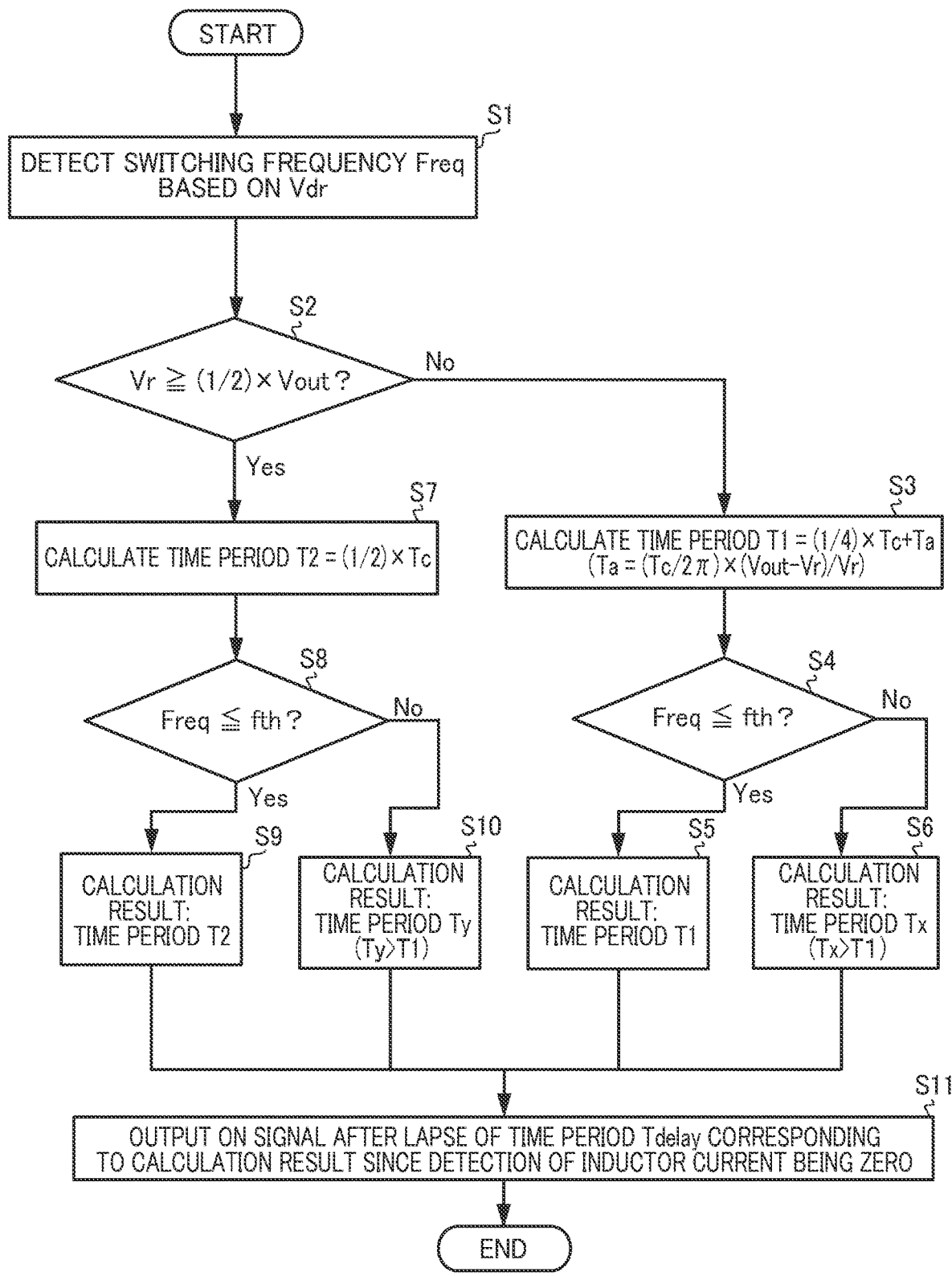
FIG. 9 illustrates an example of an operation flow of a power factor correction IC 35*a*.
Figure 10:
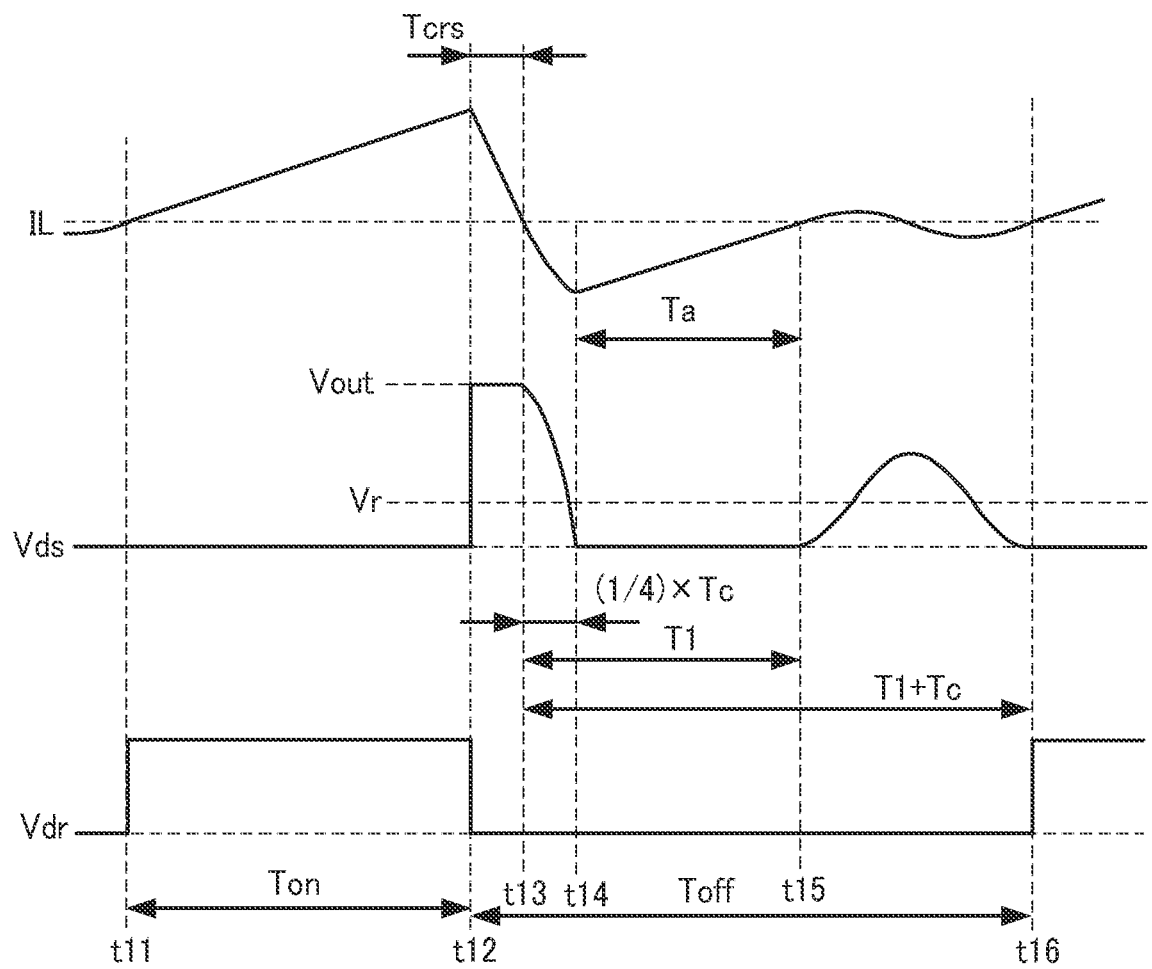
FIG. 10 illustrates an example of waveforms of main current and voltages in an AC-DC converter 10*b* when a rectified voltage Vr is lower than ½ times an output voltage Vout.
Figure 11:
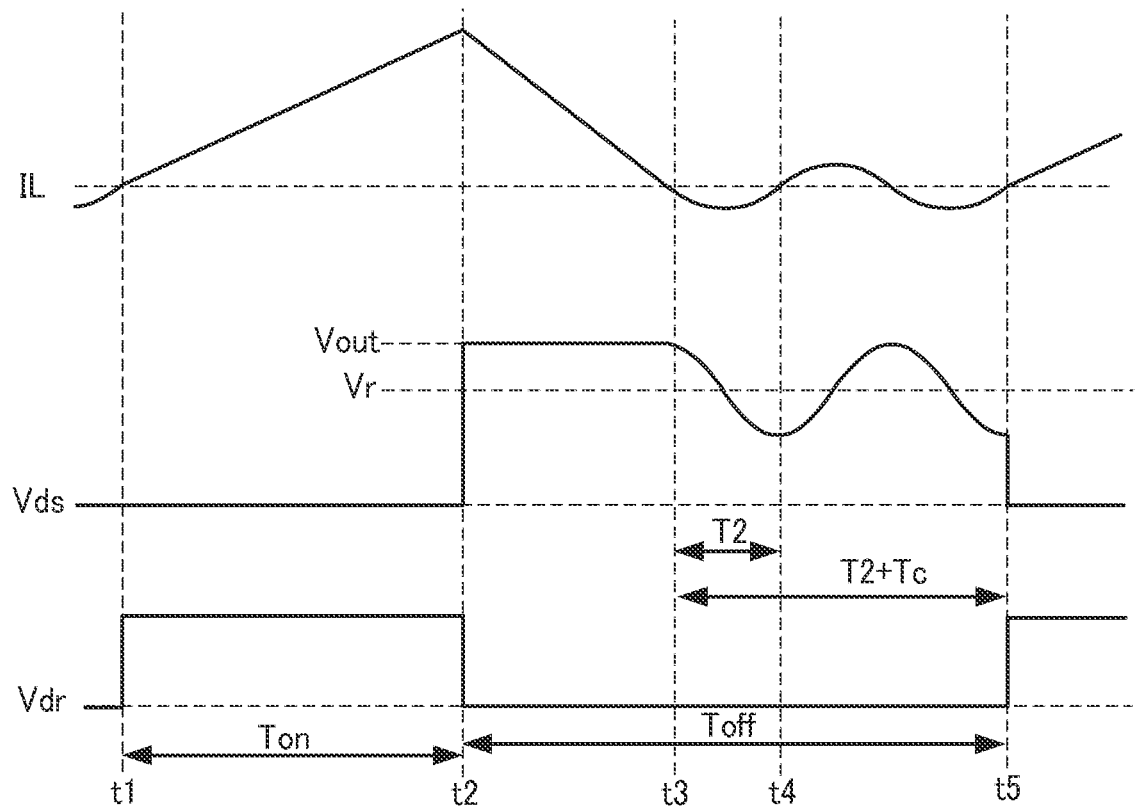
FIG. 11 illustrates an example of waveforms of main current and voltages in an AC-DC converter 10*b* when a rectified voltage Vr is higher than ½ times an output voltage Vout.

FIG. 9 is an example of an operation flow of the power factor correction IC 35a. FIG. 10 is an example of waveforms of main current and voltages in the AC-DC converter 10b when the rectified voltage Vr is lower than ½ times the output voltage Vout. FIG. 11 is an example of waveforms of main current and voltages in the AC-DC converter 10b when the rectified voltage Vr is higher than ½ times the output voltage Vout.

First, the driver circuit 60 turns on the NMOS transistor 36, and turns off after a lapse of each on period Ton, based on the feedback voltage Vfb corresponding to the voltage Vout (time t11 to t12 in FIG. 10 (corresponding to the time given the same reference numerals in FIG. 5. The same applies hereinafter), time t1 to t2 in FIG. 11 (corresponding to the time given the same reference numerals in FIG. 3. The same applies hereinafter)).

In FIG. 10, in response to turning off of the NMOS transistor 36, the inductor current IL decreases to substantially zero, and further decreases to the minimum value due to the resonance phenomenon (time t14). Thereafter, the inductor current IL returns to zero, due to the resonance phenomenon or the conduction phenomenon in which the body diode 37 conducts (time t15).

Meanwhile, in FIG. 11, in response to turning off of the NMOS transistor 36, the inductor current IL decreases to substantially zero (time t3). Thereafter, due to the resonance phenomenon, a negative current of the inductor current IL flows, and then the inductor current IL increases to substantially zero again (time t4). The following describes which one of the phenomena occurs and which timing the NMOS transistor 36 is turned on at, according to the flow of FIG. 9.

The frequency detection circuit 59 detects the switching frequency Freq, based on the voltage Vdr (S1). The frequency detection circuit 59 outputs, to the calculation circuit 62a, frequency data Freq based on the result of the detection.

Next, the first control circuit 54 determines whether the voltage Vr is equal to or larger than ½ times the voltage Vout (S2). The first control circuit 54 outputs the signal Smd1 to control the operation mode of the calculation circuit 62a according the result of the determination.

$$\text{If } Vr<(\tfrac{1}{2}) \times Vout \tag{1} \text{ (S2: NO)},$$

the conduction phenomenon occurs in the case of FIG. 10, as described above. Then, the calculation circuit 62a calculates $$\text{the time period } T1=(\tfrac{1}{4}) \times Tc+(Tc/2\pi) \times [(Vout-Vr)/Vr] \tag{10} \text{ (S3)},$$

according to the first mode.

The inductor current reaches the minimum value, and thereafter, the body diode 37 conducts (time t14), and the inductor current returns to zero (time t15). At time t15, the voltage Vds reaches the minimum value. The calculation circuit 62a can calculate the time period T1 obtained by adding the conduction period Ta of the body diode 37 (time period of from time t14 to time t15 in FIG. 10) to (¼)×Tc (time period of from time t13 to time t14 in FIG. 10).

Further, the calculation circuit 62a determines whether or not the switching frequency Freq is equal to or smaller than the threshold value fth, based on the frequency data Freq (S4).

The calculation circuit 62a is configured to, if Freq fth (S4: Yes), output the time period Tdelay=T1 (S5) as the result of the calculation, and if Freq>fth (S4: No), output the time period Tdelay=Tx=T1+nTc (Tx>T1) (S6) as the result of the calculation. In the example of FIG. 10, in S6, the calculation circuit 62a calculates a time period (time period of from time t13 to time t16) that is based on the time period Tdelay=T1+Tc if n=1.

Meanwhile, if Vr≥(½)×Vout (S2: Yes), the resonance phenomenon occurs as illustrated in FIG. 11, as described above. Accordingly, the calculation circuit 62a calculates $$\text{the time period } T2=(\tfrac{1}{2}) \times Tc \tag{11}$$

(time period of from time t3 to time t4 in FIG. 11) (S7), according to the second mode.

Furthermore, the calculation circuit 62a determines whether or not the switching frequency Freq is equal to or smaller than the threshold value fth, based on the frequency data Freq (S8).

The calculation circuit 62a is configured to, if Freq fth (S8: Yes), output the time period Tdelay=T2 as the result of the calculation (S9), and if Freq>fth (S8: No), output the time period Tdelay=Ty=T2+nTc (Ty>T2) as the result of the calculation (S10). In the example of FIG. 11, in S10, the calculation circuit 62a calculates a time period based on the time period Tdelay=T2+Tc (time period of from time t3 to time t5 in FIG. 11) if n=1.

The output circuit 63a outputs the signal Von, after a lapse of the time period Tdelay corresponding to the calculation result of the calculation circuit 62a since it is detected that the inductor current IL has reached zero (S11). At time t16 in the example of FIG. 10, and at time t5 in the example of FIG. 11, the output circuit 63a outputs the signal Von to turn on the NMOS transistor 36.

As described above, the power factor correction IC 35a can drive the NMOS transistor 36 at the timing at which the voltage Vds reaches the minimum value, when both the resonance phenomenon and the conduction phenomenon occur. Accordingly, the power factor correction IC 35a can reduce switching loss in the AC-DC converter 10b.

Note that the time period T1 corresponds to a "first time period", and the time period T2 corresponds to a "second time period". Further, in the inductor current IL, a value of substantially zero (several mA) corresponds to a "first predetermined value".

===Configuration of Power Factor Correction IC 35b===

Figure 12:
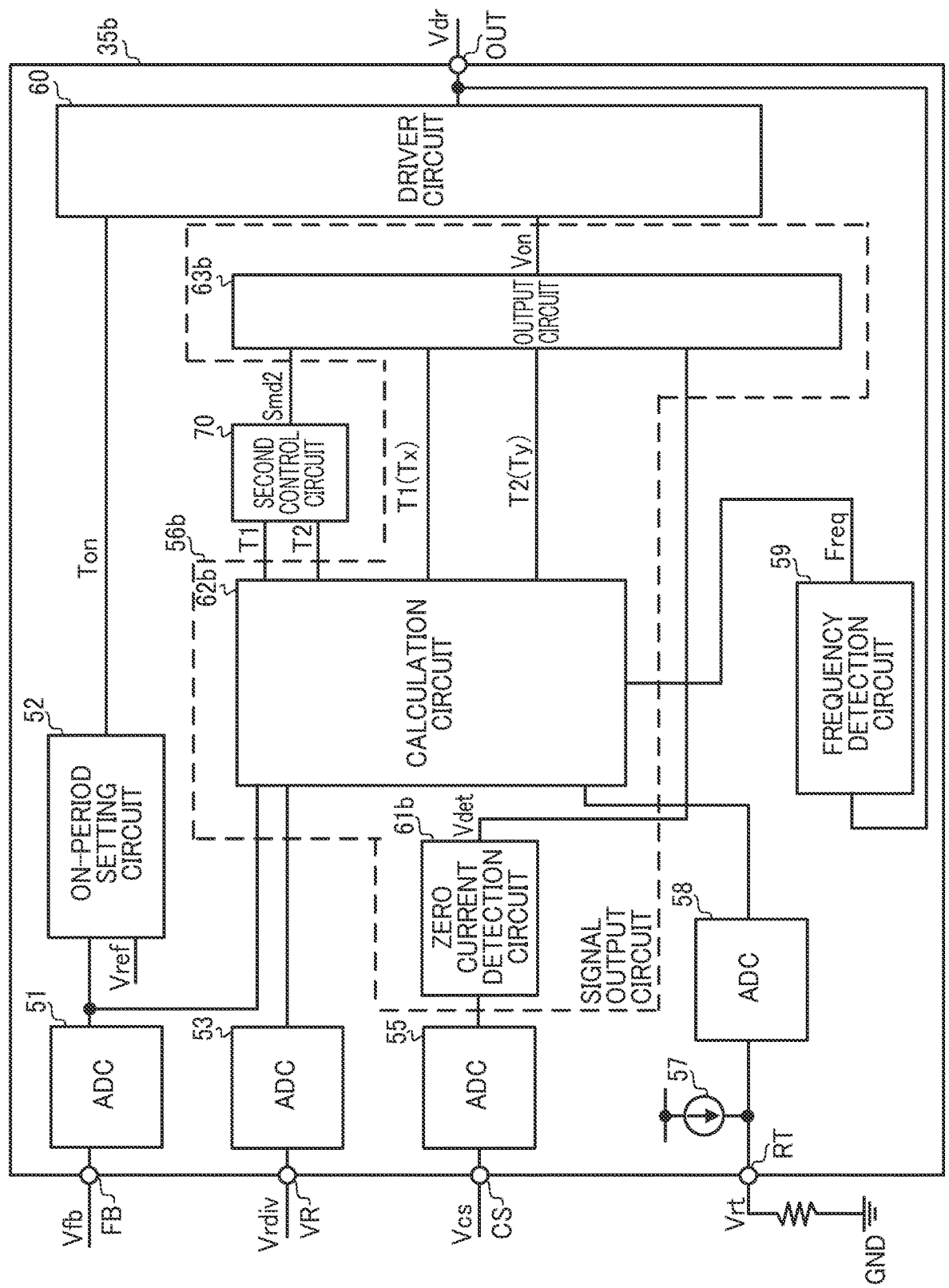
FIG. 12 illustrates an example of a configuration of a power factor correction IC 35*b*.

FIG. 12 illustrates an example of a configuration of a power factor correction IC 35b. The power factor correction IC 35b includes the analog-to-digital converters (ADCs) 51, 53, 55, 58, the on period setting circuit 52, a signal output circuit 56b, the current source 57, the frequency detection circuit 59, the driver circuit 60, and a second control circuit 70. Here, the parts or elements that are the same as those illustrated in FIG. 7 are given the same reference numerals. The power factor correction IC 35b is configured so as to be included in the AC-DC converter 10b in FIG. 6, in place of the power factor correction IC 35a.

The following mainly describes differences between the power factor correction IC 35b and the power factor correction IC 35a. The power factor correction IC 35b is different from the power factor correction IC 35a in including the signal output circuit 56b and the second control circuit 70 without including the first control circuit 54.

The power factor correction IC 35b determines whether the resonance phenomenon is occurring or the conduction phenomenon is occurring, based on Determination principle 3 of $$(1/4)Tc+Ta>[(\pi+2)/4\pi]\times Tc \quad (8).$$

Then, the power factor correction IC 35b controls whether the voltage Vdr to be applied to the gate electrode of the NMOS transistor 36 is changed at the timing corresponding to the time period T1, or it is changed at the timing corresponding to the time period T2, based on the result of the determination.

The signal output circuit 56b outputs the signal Von at the timing corresponding the time period T1 or T2, in response to the inductor current IL reaching zero after the NMOS transistor 36 is turned off, based on Calculation principle 1 of $$(Tc/2\pi)\times[(Vout-Vr)/Vr] \quad (7).$$

The signal output circuit 56b includes a zero current detection circuit 61b, a calculation circuit 62b, and an output circuit 63b.

The zero current detection circuit 61b, as in the zero current detection circuit 61a, outputs the signal Vdet upon detecting that the inductor current IL has reached substantially zero, based on the voltage Vcs.

The second control circuit 70 determines whether the condition of an expression of Determination principle 3 of $$(1/4)Tc+Ta>[(\pi+2)/4\pi]\times Tc \quad (8)$$

is satisfied. The following describes a specific process of the calculation circuit 62b with reference to FIGS. 13 and 14, and also describes the relationship between the second control circuit 70 and the calculation circuit 62b.

===Process to be Performed by Calculation Circuit 62b and Second Control Circuit 70===

Figure 13:
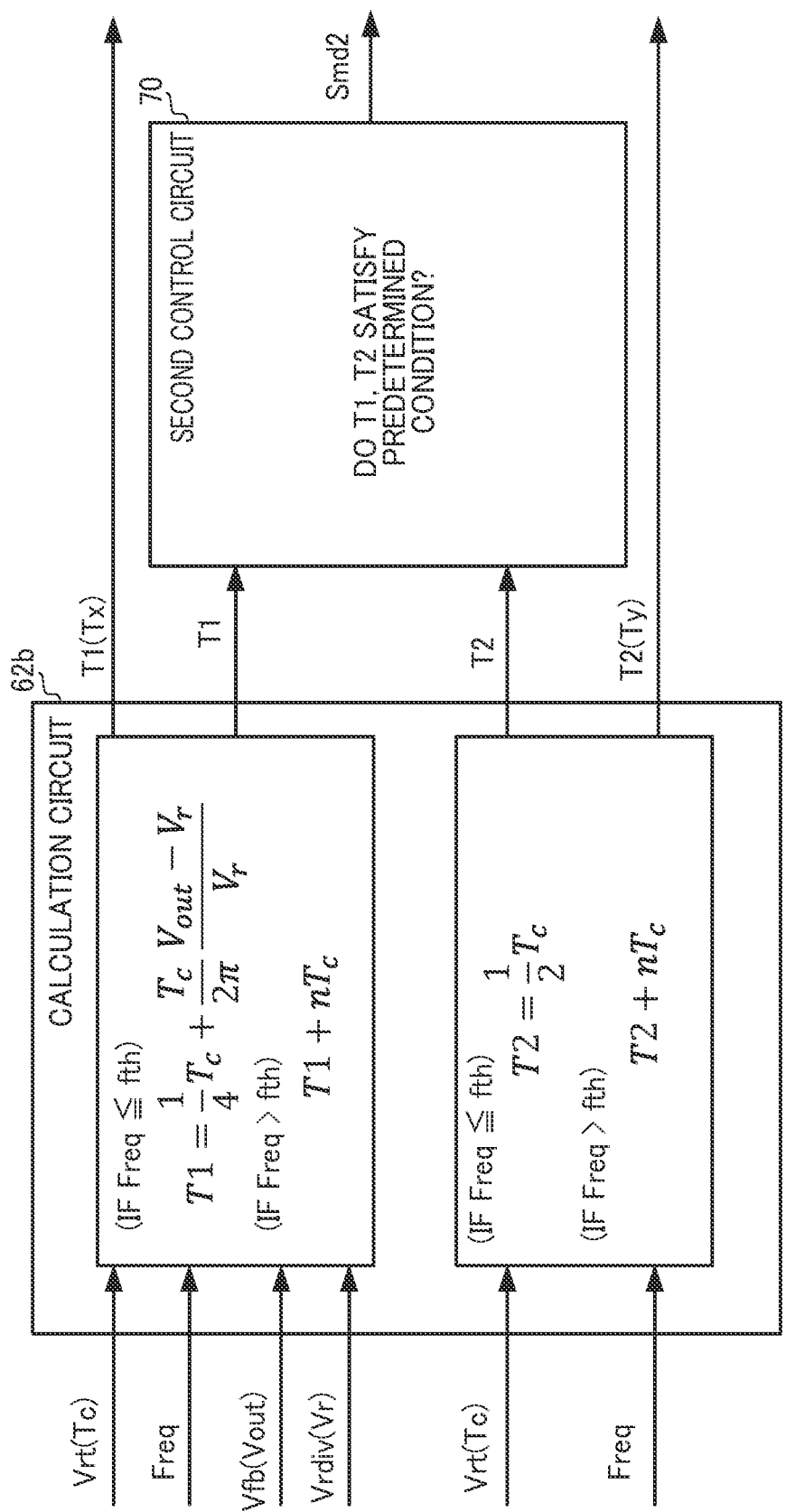
FIG. 13 illustrates an example of a process to be performed by a calculation circuit 62*b* and a second control circuit 70.

FIG. 13 illustrates an example of a process to be performed by the calculation circuit 62b and the second control circuit 70.

The calculation circuit 62b continues to calculate the time period $T1=(1/4)\times Tc+(Tc/2\pi)\times[(Vout-Vr)/Vr]$ (10), and $$T2=(1/2)\times Tc \quad (11).$$

Specifically, the calculation circuit 62b can calculate the time period T1, based on the voltages Vrt, Vfb, Vrdiv, and data on the frequency Freq. Further, the calculation circuit 62b outputs, to the output circuit 63b, a calculation result T1, if the switching frequency Freq is equal to or smaller than the threshold value fth (Freq≤fth), and outputs thereto a calculation result T1+nTc, if Freq>fth.

Further, the calculation circuit 62b can calculate the time period T2, based on the voltages Vrt, Vfb, Vrdiv, and data on the frequency Freq. Further, the calculation circuit 62b outputs, to the output circuit 63b, a calculation result T2, if Freq fth, and outputs thereto the calculation result T2+nTc, if Freq>fth.

The second control circuit 70 determines whether the condition of Expression (8) of Determination principle 3:

$$(1/4)Tc+Ta>[(\pi+2)/4\pi]\times Tc,$$

based on the result of the calculation of the calculation circuit 62b. Accordingly, the second control circuit 70 outputs a signal Smd2 to control whether the output circuit 63b turns on the NMOS transistor 36 at the timing based on the time period T1, or the timing based on the time period T2. Note that, in an embodiment of the present disclosure, the determination is performed using the time periods T1, T2, however, the time period T1+nTc and the time period T2+nTc may be used for the determination.

The output circuit 63b outputs the signal Von, based on the time period T1, when the time periods T1, T2 satisfy the condition of Expression (8) (the first mode), and outputs the signal Von, based on the time period T2, when the condition of Expression (8) is not satisfied (the second mode). In specific, the output circuit 63 outputs the signal at the timing based on the time period T1 or T2, if Freq≤fth, and outputs the signal at the timing based on the time period T1+nTc or T2+nTc, if Freq>fth.

===Operation Flow of Power Factor Correction IC 35b===

Figure 14:
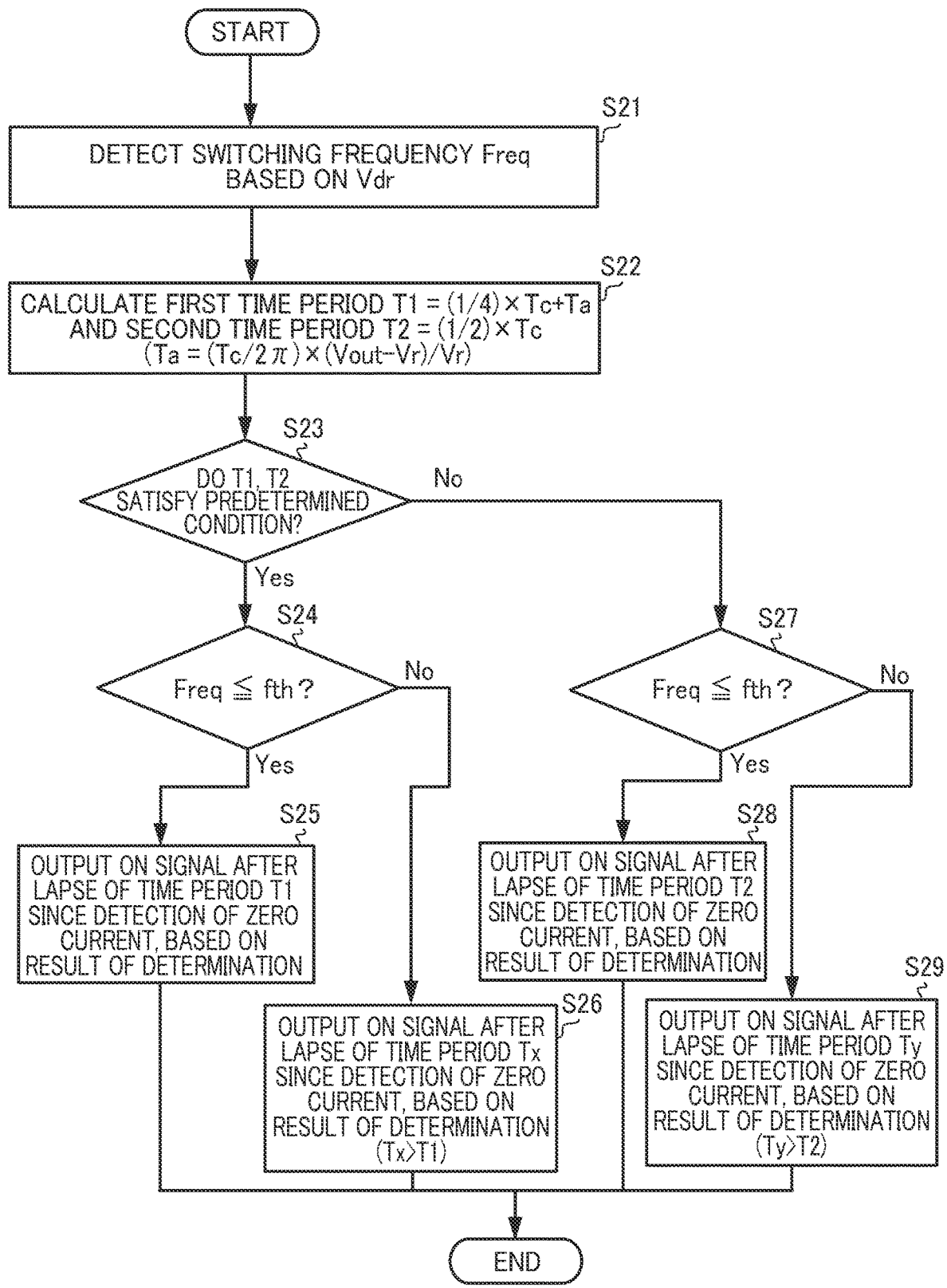
FIG. 14 illustrates an example of an operation flow of a power factor correction IC 35*b*.

FIG. 14 is an example of an operation flow of the power factor correction IC 35b.

First, the frequency detection circuit 59 detects the switching frequency Freq, based on the voltage Vdr (S21). The frequency detection circuit 59 outputs data on the frequency Freq based on the result of the detection, to the calculation circuit 62b.

Next, the calculation circuit 62b calculates the time period $T1=(1/4)\times Tc+(Tc/2\pi)\times[(Vout-Vr)/Vr]$ (10), and the time period $T2=(1/2)\times Tc$ (11) (S22).

Subsequently, the second control circuit 70 determines whether the time periods T1, T2 satisfy the predetermined condition (Expression (8): $(1/4)Tc+Ta>[(\pi+2)/4\pi]\times Tc$) (S23). The second control circuit 70 outputs the signal Smd2 to control the timing at which the output circuit 63b outputs the signal to turn on the NMOS transistor 36, based on the result of the determination.

Here, the calculation circuit 62b changes the result of the calculation to be transmitted to the output circuit 63, depending on whether Freq≤fth is satisfied. When the time periods T1, T2 satisfy the predetermined condition (S23: Yes), whether Freq≤fth is satisfied is determined in the calculation circuit 62b (S24).

If Freq≤fth (S24: Yes), the result of the calculation of the calculation circuit 62b is the time period T1. The output circuit 63b outputs the signal Von, based on the signal Smd2 and the result of the calculation of the calculation circuit 62b (S25).

Meanwhile, if Freq>fth (S24: No), the result of the calculation from the calculation circuit 62b is a time period Tx=T1+nTc. The output circuit 63b outputs the signal Von, based on the signal Smd2 and the result of the calculation of the calculation circuit 62b (S26).

When the time periods T1, T2 do not satisfy the predetermined condition (S23: No), whether Freq fth is satisfied is determined in the calculation circuit 62b (S27).

If Freq fth (S27: Yes), the result of the calculation from the calculation circuit 62b is the time period T2. The output circuit 63b outputs the signal Von, based on the signal Smd2 and the result of the calculation of the calculation circuit 62b (S28).

Meanwhile, if Freq>fth (S27: No), the result of the calculation of the calculation circuit 62b is a time period Ty=T2+nTc. The output circuit 63b outputs the signal Von, based on the signal Smd2 and the result of the calculation of the calculation circuit 62b (S29).

As described above, in the power factor correction IC 35b as well, in both the case where the resonance phenomenon occurs and the case where the conduction phenomenon occurs, the NMOS transistor 36 can be driven at the timing at which the voltage Vds reaches the minimum value. Accordingly, the power factor correction IC 35b can reduce switching loss in the AC-DC converter 10b.

==Configuration of the AC-DC Converter 10c==

Figure 15:
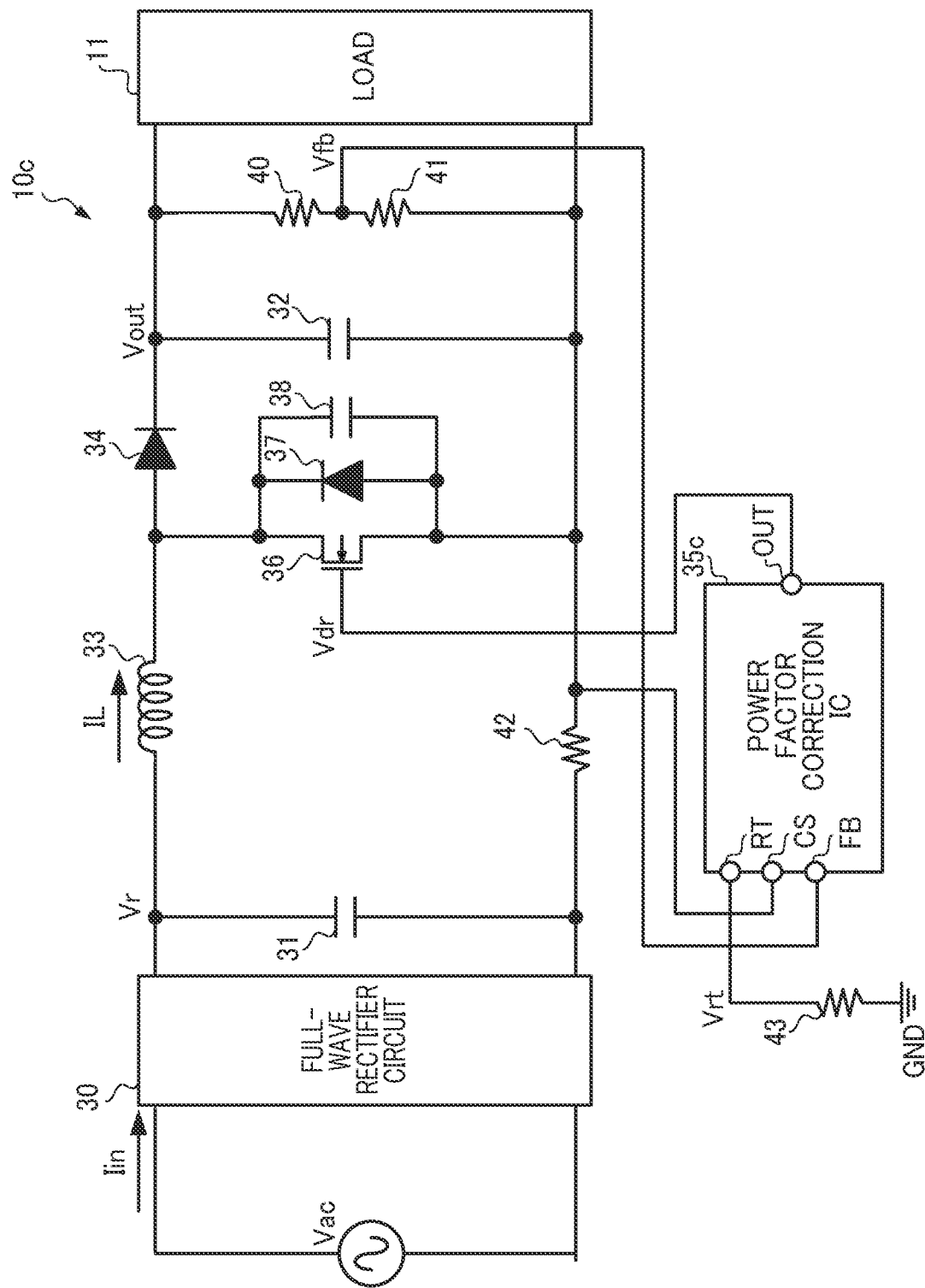
FIG. 15 illustrates an example of a circuit diagram of an AC-DC converter 10*c* according to an embodiment.

FIG. 15 illustrates an example of a circuit diagram of an AC-DC converter 10c according to an embodiment. The AC-DC converter 10c includes a power factor correction IC 35c having terminals that are different from the terminals of the power factor correction IC 35a in the AC-DC converter 10b in FIG. 6. Note that the parts or elements that are the same between FIG. 1 and FIG. 6 are given the same reference numerals.

The power factor correction IC 35c according to an embodiment of the present disclosure does not include the terminal VR to receive the voltage obtained by dividing the rectified voltage Vr. Further, the AC-DC converter 10c does not include the resistors 44, 45.

The power factor correction IC 35c determines whether the resonance phenomenon is occurring or the conduction phenomenon is occurring, based on Determination principle 2 of $$Tcrs/(Ton+Tcrs)<1/2 \qquad (4).$$

Then, if the conduction phenomenon is occurring, the power factor correction IC 35c calculates a conduction period, based on Calculation principle 2 of $$Ta=(Tc/2\pi)\times(Tcrs/Ton) \qquad (9).$$

Then, the power factor correction IC 35c controls the timing at which the NMOS transistor 36 is turned on. Accordingly, the power factor correction IC 35c can address the conduction phenomenon. The following describes a configuration of the power factor correction IC 35c.

===Configuration of Power Factor Correction IC 35c===

Figure 16:
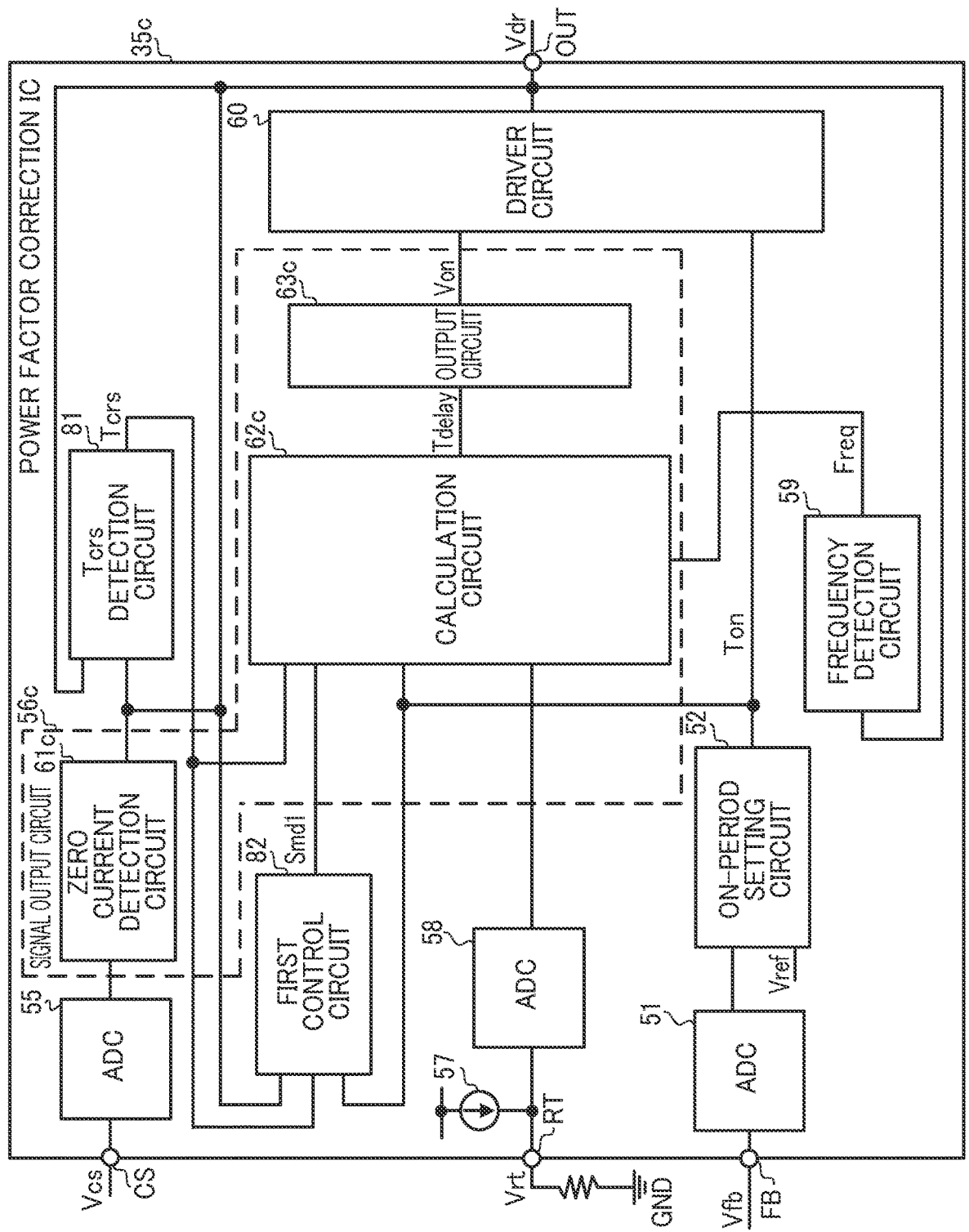
FIG. 16 illustrates an example of a configuration of a power factor correction IC 35*c*.

FIG. 16 illustrates an example of a configuration of the power factor correction IC 35c. The power factor correction IC 35c includes the analog-to-digital converters (ADCs) 51, 55, 58, the on period setting circuit 52, a Tcrs detection circuit 81, a signal output circuit 56c, the current source 57, the frequency detection circuit 59, the driver circuit 60, and a first control circuit 82. Here, the parts or elements that are the same as those illustrated in FIG. 7 are given the same reference numerals.

The following mainly describes differences between the power factor correction IC 35c and the power factor correction ICs 35a, 35b.

The Tcrs detection circuit 81 detects a time period of from when the NMOS transistor 36 is turned off to when the inductor current IL reaches substantially zero (e.g., several mA). Specifically, the Tcrs detection circuit 81 detects the timing at which the NMOS transistor 36 is turned off, based on the voltage Vdr, and detects the timing at which the inductor current IL has reached substantially zero, based on the signal Vdet outputted from a zero current detection circuit 61c, which will be described later. The Tcrs detection circuit 81 detects the time period Tcrs, based on the difference between these timings.

The first control circuit 82 determines whether the resonance phenomenon is occurring or the conduction phenomenon is occurring, based on Determination principle 2 for determining whether $$Tcrs/(Ton+Tcrs)<1/2 \qquad (4)$$

is satisfied according to the time periods Ton, Tcrs, and outputs the signal Smd1 corresponding to the result of the determination.

The signal output circuit 56c outputs the signal Von to turn on the NMOS transistor 36, after a lapse of the time period Tdelay since the inductor current IL has reached substantially zero. The signal output circuit 56c includes the zero current detection circuit 61c, a calculation circuit 62c, and an output circuit 63c.

The zero current detection circuit 61c outputs the signal Vdet, upon detecting that the inductor current IL has reached substantially zero, based on the voltage Vcs, as in the zero current detection circuits 61a, 61b.

The calculation circuit 62c will be described with reference to FIG. 17.

===Process to be Performed by Calculation Circuit 62c===

Figure 17:
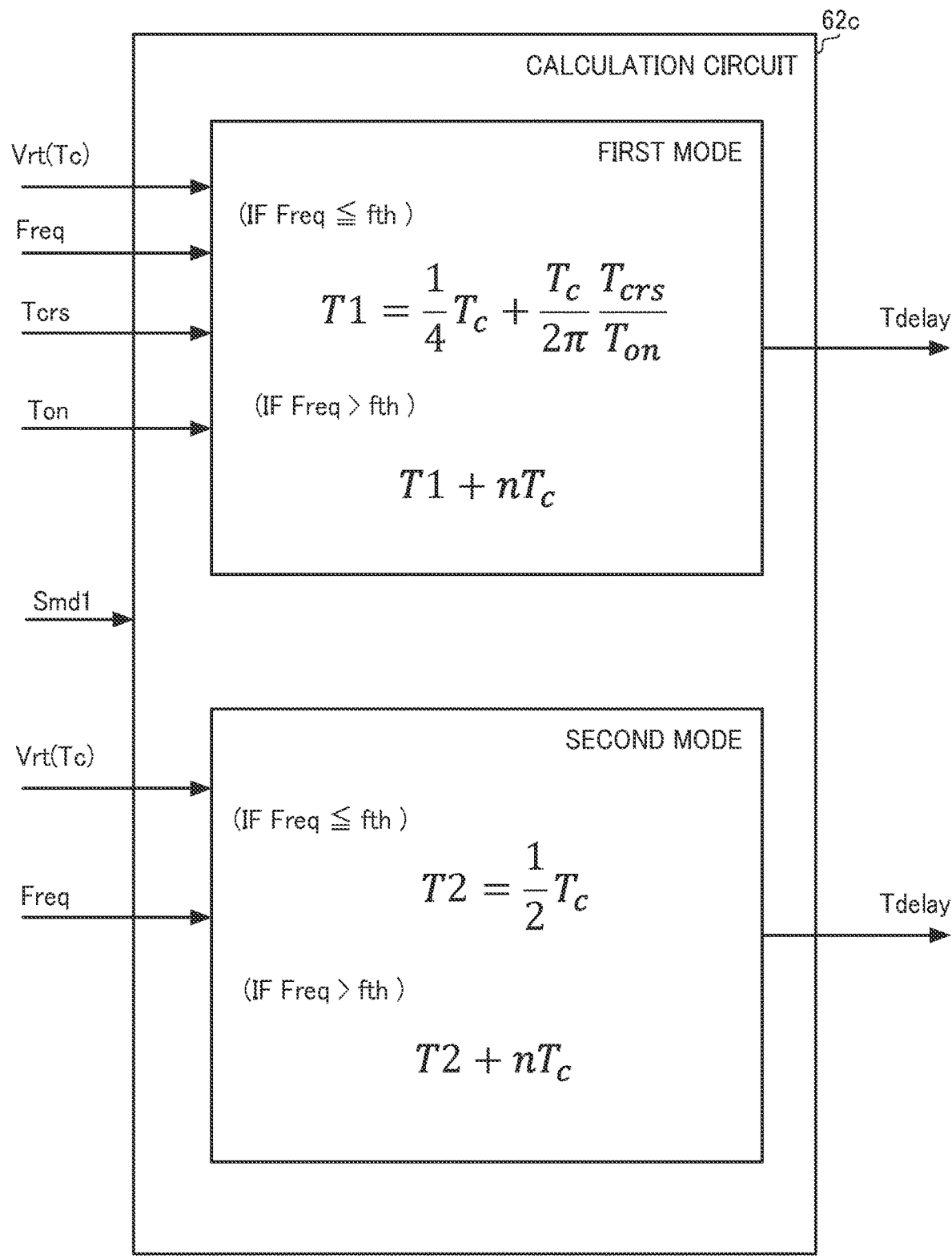
FIG. 17 illustrates an example of a process to be performed by a calculation circuit 62*c*.

FIG. 17 illustrates an example of a process to be performed by the calculation circuit 62c. Which mode the calculation circuit 62c operates in is selected based on the signal Smd1 from the first control circuit 82.

Note that the frequency with which the calculation circuit 62c performs calculation may be every predetermined period sufficiently shorter than each period with which the inductor current IL, the rectified voltage Vr, the output voltage Vout, or the like changes, as in the calculation circuit 62a. Further, the calculation circuit 62c may perform calculation every time when the zero current detection circuit 61c detects that the inductor current IL has reached substantially zero.

If the switching frequency Freq is equal to or smaller than the predetermined threshold value fth (e.g., 200 kHz) in the first mode, the calculation circuit 62c sets the result of the calculation of the time period Tdelay to $$\text{the time period } T1=(1/4)\times Tc+(Tc/2\pi)\times(Tcrs/Ton) \qquad (12).$$

Meanwhile, if the switching frequency Freq exceeds the predetermined threshold value fth, the calculation circuit 62c sets the result of the calculation of the time period Tdelay to T1+nTc (n is a natural number).

As the switching frequency Freq increases, the power loss due to switching increases. To reduce the switching loss, the time period Tdelay is increased, and switching frequency is reduced. The magnitude of the natural number n is preset such that the frequency Freq will reach the predetermined threshold value fth. Accordingly, the switching frequency Freq can be maintained equal to or smaller than the predetermined threshold value fth.

Further, if the switching frequency Freq is equal to or smaller than the predetermined threshold value fth, in the second mode, the calculation circuit 62c sets the result of the calculation of the time period Tdelay to $$\text{the time period } T2=(1/2)\times Tc \qquad (11).$$

Furthermore, if the switching frequency Freq exceeds the predetermined threshold value fth, the calculation circuit 62c sets the result of the calculation of the time period Tdelay to T2+nTc (n is a natural number). The magnitude of the natural number n is preset such that the frequency Freq will reach the predetermined threshold value fth, in both the case where the time period Tdelay is T1+nTc and the case where the time period Tdelay is T2+nTc. This makes it possible to increase the time period Tdelay longer, and maintain the switching frequency Freq equal to or smaller than the predetermined threshold value fth.

The output circuit 63c in FIG. 16 outputs the signal Von to turn on the NMOS transistor 36 at the timing based on the time period Tdelay calculated by the calculation circuit 62c, in response to the signal Vdet indicating that the inductor current IL has reached substantially zero.

===Operation Flow of Power Factor Correction IC 35c===

Figure 18:
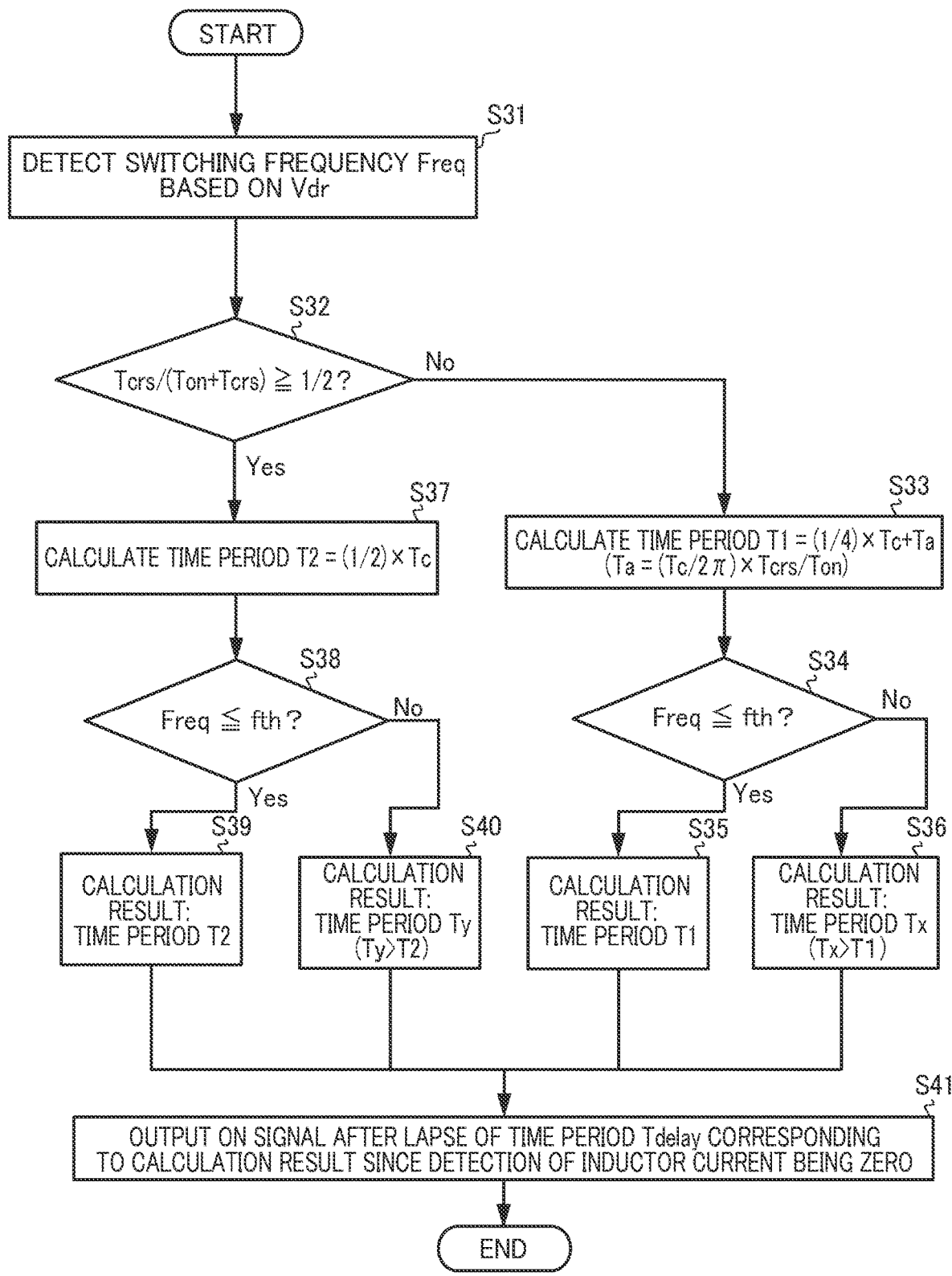
FIG. 18 illustrates an example of an operation flow of a power factor correction IC 35*c*.

FIG. 18 illustrates an example of an operation flow of the power factor correction IC 35c. Note that the relationship between the steps of the operation flow in FIG. 18 and the timings in the waveforms in FIGS. 10 and 11 is the same as in FIG. 9.

The frequency detection circuit 59 detects the switching frequency Freq, based on the voltage Vdr (S31). The frequency detection circuit 59 outputs the frequency data Freq based on the result of the detection, to the calculation circuit 62c.

Next, the first control circuit 54 determines whether the voltage Vr is equal to or larger than ½ times the voltage Vout (S32). The first control circuit 54 outputs the signal Smd1 to control the operation mode of the calculation circuit 62c, based on the result of the determination.

$$\text{If } Tcrs/(Ton+Tcrs)<½ \qquad (4) \text{ (S32: No)},$$

the conduction phenomenon of the body diode 37 occurs. Then, the calculation circuit 62c calculates $$\text{the time period } T1=(¼)\times Tc+(Tc/2\pi)\times(Tcrs/Ton) \qquad (12),$$

according to the first mode (S33).

Further, the calculation circuit 62c determines whether the switching frequency Freq is equal to or smaller than the threshold value fth, based on the frequency data Freq (S34).

The calculation circuit 62c is configured to, if Freq≤fth (S34: Yes), output the time period Tdelay=T1 as the result of the calculation (S35), and if Freq>fth (S34: No), output the time period Tdelay=Tx=T1+nTc (Tx>T1) as the result of the calculation (S36).

$$\text{Meanwhile, if } Tcrs/(Ton+Tcrs)≥½ \qquad \text{(S32: Yes)},$$

the resonance phenomenon occurs. Accordingly, the calculation circuit 62c calculates $$\text{the time period } T2=(½)\times Tc \qquad (11),$$

according to the second mode (S37).

Further, the calculation circuit 62c determines whether or not the switching frequency Freq is equal to or smaller than the threshold value fth, based on the frequency data Freq (S38).

The calculation circuit 62c is configured to, if Freq≤fth (S38: Yes), output the time period Tdelay=T2 as the result of the calculation (S39), and if Freq>fth (S38: No), output the time period Tdelay=Ty=T2+nTc (Ty>T2) as the result of the calculation (S40).

The output circuit 63c outputs the signal Von, after a lapse of the time period Tdelay corresponding to the result of the calculation of the calculation circuit 62c since it is detected that the inductor current IL has reached zero (S41).

As described above, in the power factor correction IC 35c as well, in both the case where the resonance phenomenon occurs and the case where the conduction phenomenon occurs, the NMOS transistor 36 can be driven at the timing at which the voltage Vds reaches the minimum value. Accordingly, the power factor correction IC 35c can reduce switching loss in the AC-DC converter 10c.

===Configuration of Power Factor Correction IC 35d===

Figure 19:
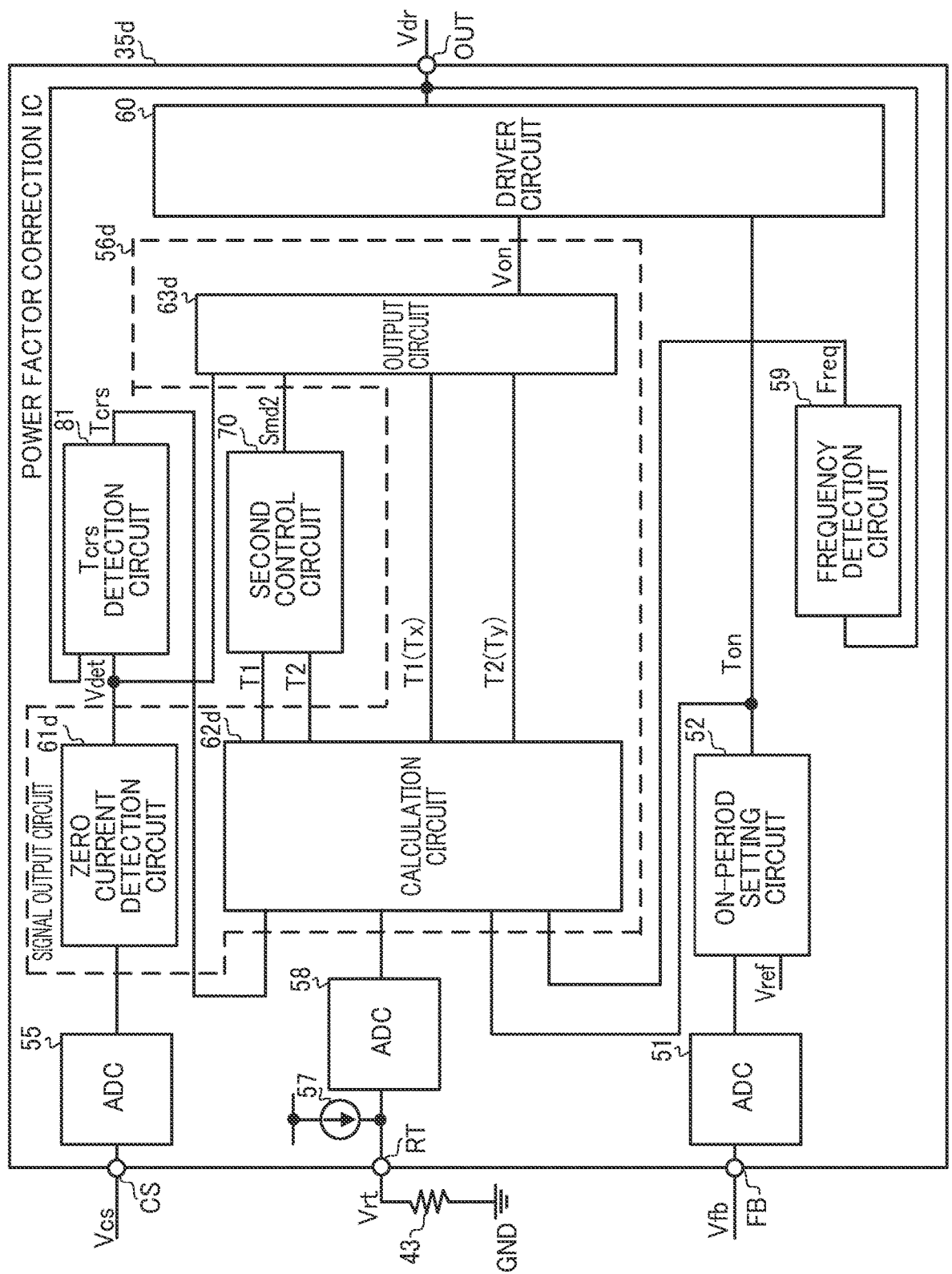
FIG. 19 illustrates an example of a configuration of a power factor correction IC 35*d*.

FIG. 19 illustrates an example of a configuration of a power factor correction IC 35d.

The power factor correction IC 35d includes the ADCs 51, 55, 58, the on period setting circuit 52, a signal output circuit 56d, the current source 57, the frequency detection circuit 59, the driver circuit 60, and the second control circuit 70. Here, the parts or elements that are the same as those illustrated in FIG. 12 are given the same reference numerals. The power factor correction IC 35d is configured so as to be included in the AC-DC converter 10c in FIG. 15, in place of the power factor correction IC 35c.

The following mainly describes differences between the power factor correction IC 35d and the power factor correction IC 35c. The power factor correction IC 35d is different from the power factor correction IC 35c in including the signal output circuit 56d and the second control circuit 70 without including the first control circuit 54.

The power factor correction IC 35d determines whether the resonance phenomenon is occurring or the conduction phenomenon is occurring, based on Determination principle 3 of $$(¼)Tc+Ta>[(\pi+2)/4\pi]\times Tc \qquad (8).$$

Then, the power factor correction IC 35d controls whether the voltage Vdr to be applied to the gate electrode of the NMOS transistor 36 is changed at the timing corresponding to the time period T1 or at the timing corresponding to the time period T2.

The signal output circuit 56d outputs the signal Von at the timing corresponding to the time period T1 or T2, in response to the inductor current IL reaching zero after the NMOS transistor 36 is turned off, based on Calculation principle 2 of $$Ta=(Tc/2\pi)\times(Tcrs/Ton) \qquad (9).$$

The signal output circuit 56d includes a zero current detection circuit 61d, a calculation circuit 62d, and an output circuit 63d.

The second control circuit 70 determines whether the condition of Expression (8) of Determination principle 3:

$$(¼)Tc+Ta>[(\pi+2)/4\pi]\times Tc.$$

Figure 20:
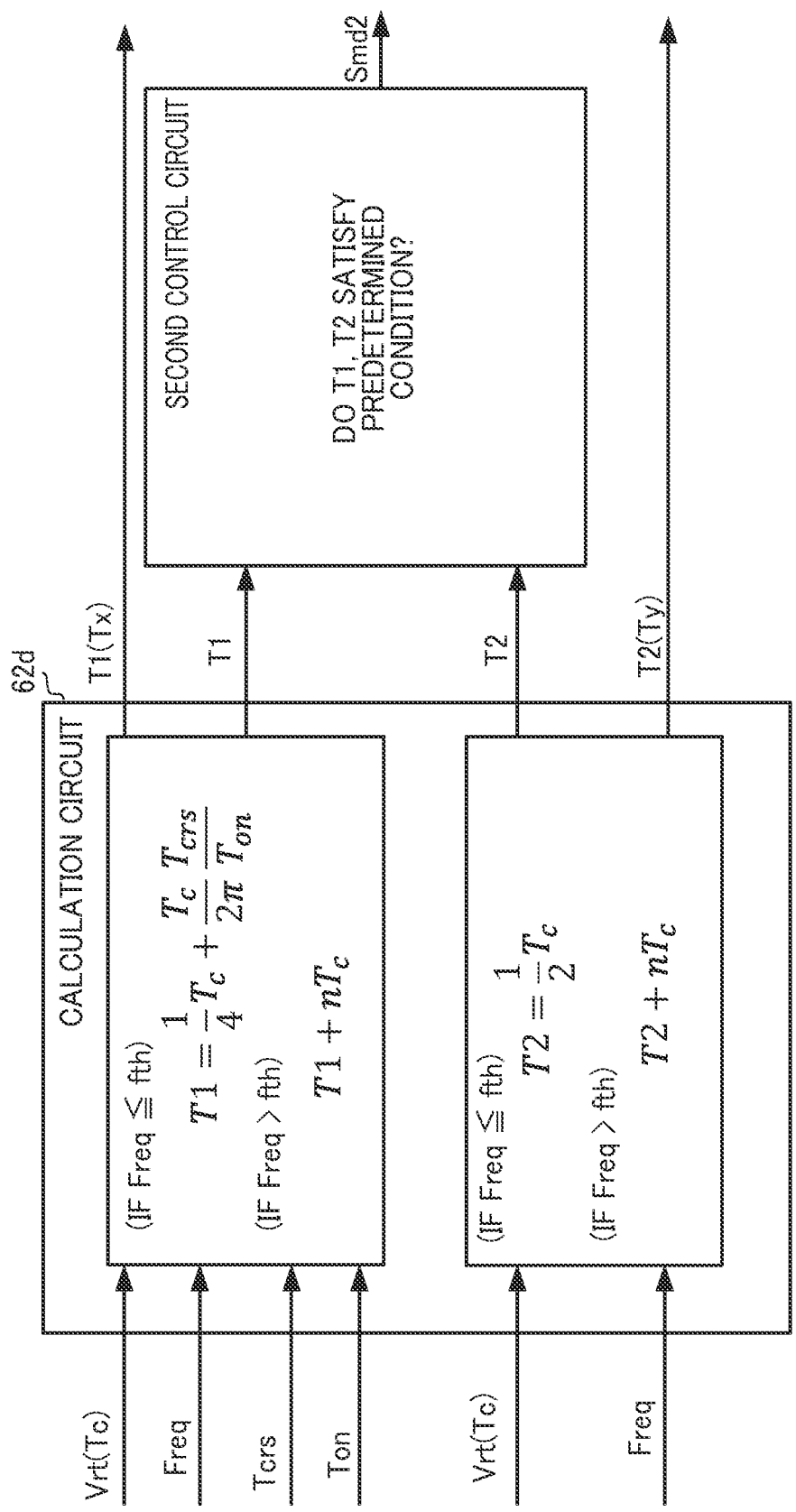
FIG. 20 illustrates an example of a process to be performed by a calculation circuit 62*d* and a second control circuit 70.
Figure 21:
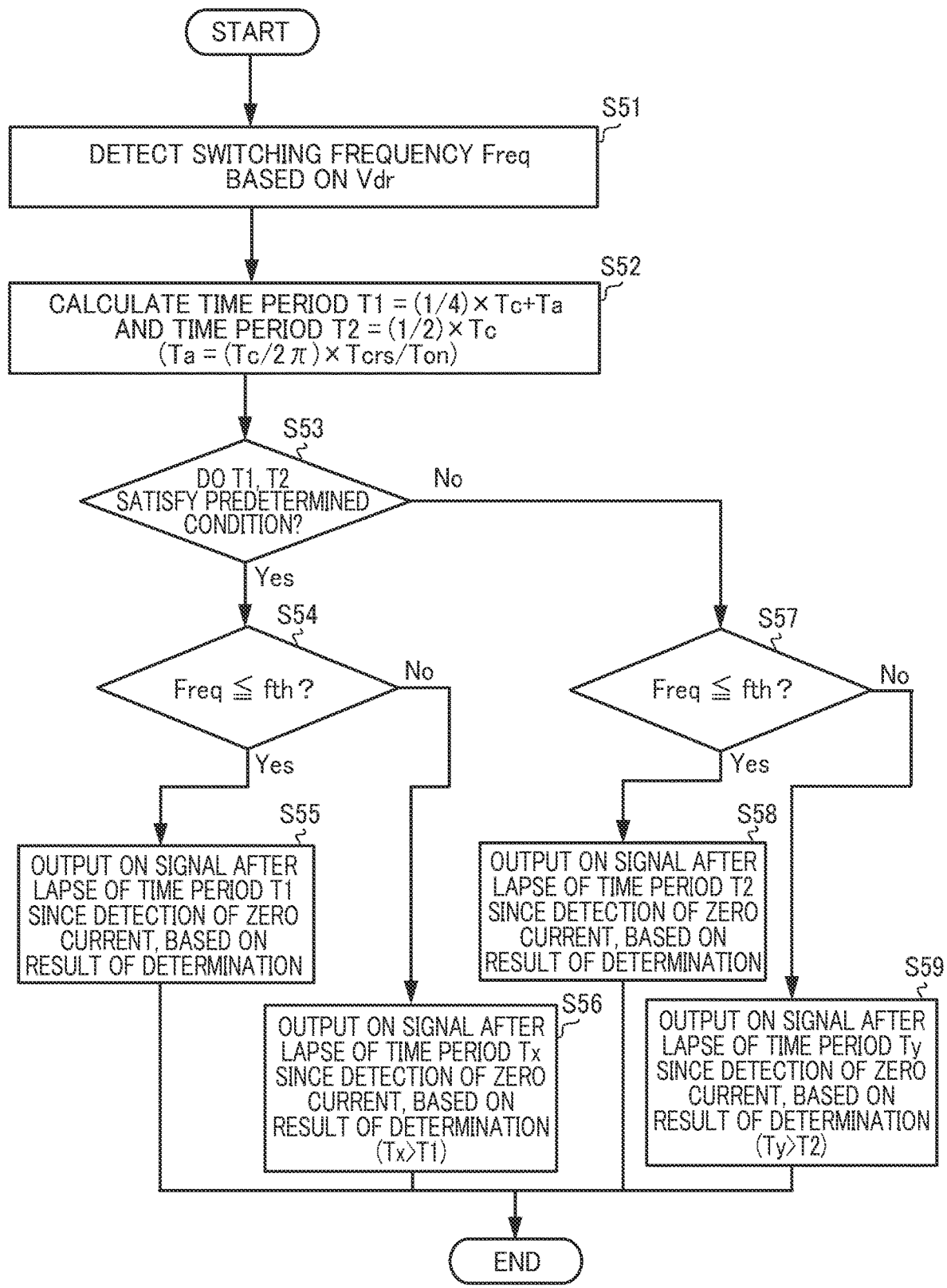
FIG. 21 illustrates an example of an operation flow of a power factor correction IC 35d.

The following describes a specific configuration of the calculation circuit 62d, with reference to FIGS. 20 and 21, and also the relationship between the second control circuit 70 and the calculation circuit 62d.

===Process to be Performed by Calculation Circuit 62d and Second Control Circuit 70===

FIG. 20 illustrates an example of a process to be performed by the calculation circuit 62d and the second control circuit 70.

The calculation circuit 62d continues to calculate $$\text{the time period } T1=(¼)\times Tc+(Tc/2\pi)\times(Tcrs/Ton) \qquad (12), \text{ and}$$

$$T2=(½)\times Tc \qquad (11).$$

Specifically, the calculation circuit 62d can calculate the time period T1, based on the voltage Vrt, Tcrs, Ton, and data on the frequency Freq. Further, the calculation circuit 62d outputs, to the output circuit 63d, the calculation result T1, if the switching frequency Freq is equal to or smaller than the threshold value fth (Freq≤fth), and outputs thereto the calculation result T1+nTc, if Freq>fth.

Further, the calculation circuit 62*d* can calculate the time period T2, based on the voltage Vrt, Tcrs, Ton, and data on the frequency Freq. Further, the calculation circuit 62*d* outputs, to the output circuit 63*b*, the calculation result T2, if Freq fth, and outputs thereto the calculation result T2+nTc, if Freq>fth.

The second control circuit 70 determines whether the condition of Expression (8) of Determination principle 3 is satisfied, based on the result of the calculation of the calculation circuit 62*d*. Accordingly, the second control circuit 70 outputs the signal Smd2 to control whether the output circuit 63*d* turns on the NMOS transistor 36 at the timing based on the time period T1, or at the timing based on the time period T2. Note that, in an embodiment of the present disclosure, the determination is performed using the time period T1 and the time period T2, however, the time period T1+nTc and the time period T2+nTc may be used for the determination.

The output circuit 63*d* outputs the signal Von, based on the time period T1, when the time periods T1, T2 satisfy the condition of Expression (8) (the first mode), and outputs the signal Von, based on the time period T2, when the condition of Expression (8) is not satisfied (the second mode). In specific, the output circuit 63*d* outputs the signal at the timing based on the time period T1 or T2, if Freq≤fth is satisfied, and outputs the signal at the timing based on the time period T1+nTc or T2+nTc, if Freq>fth.

===Operation Flow of Power Factor Correction IC 35*d*===

FIG. 21 illustrates an example of an operation flow of the power factor correction IC 35*d*.

First, the frequency detection circuit 59 detects the switching frequency Freq, based on the voltage Vdr (S51). The frequency detection circuit 59 outputs data on the frequency Freq based on the result of the detection, to the calculation circuit 62*d*.

Next, the calculation circuit 62*d* calculates $$\text{the time period } T1 = (\tfrac{1}{4}) \times Tc + (Tc/2\pi) \times [Tcrs/Ton] \quad (12), \text{ and}$$

$$\text{the time period } T2 = (\tfrac{1}{2}) \times Tc \quad (11) \ (S52).$$

Subsequently, the second control circuit 70 determines whether the time periods T1, T2 satisfy the predetermined condition (Expression (8): (¼)Tc+Ta>[(π+2)/4π]×Tc) (S53). The second control circuit 70 outputs the signal Smd2 to control the timing at which the output circuit 63*d* outputs the signal to turn on the NMOS transistor 36, based on the result of the determination.

Here, the calculation circuit 62*d* changes the result of the calculation to be transmitted to the output circuit 63, depending on whether Freq≤fth is satisfied.

When the time periods T1, T2 satisfy the predetermined condition (S53: Yes), the calculation circuit 62*d* determines whether Freq≤fth is satisfied (S54).

If Freq≤fth (S54: Yes), the result of the calculation of the calculation circuit 62*d* is the time period T1. The output circuit 63*d* outputs the signal Von, based on the signal Smd2 and the result of the calculation of the calculation circuit 62*d* (S55).

Meanwhile, if Freq>fth (S54: No), the result of the calculation of the calculation circuit 62*d* is the time period Tx=T1+nTc. The output circuit 63*d* outputs the signal Von, based on the signal Smd2 and the result of the calculation of the calculation circuit 62*d* (S56).

When the time periods T1, T2 do not satisfy the predetermined condition (S53: No), whether Freq≤fth is satisfied is determined in the calculation circuit 62*d* (S57).

If Freq≤fth (S57: Yes), the result of the calculation of the calculation circuit 62*d* is the time period T2. The output circuit 63*d* outputs the signal Von, based on the signal Smd2 and the result of the calculation of the calculation circuit 62*d* (S58).

Meanwhile, if Freq>fth (S57: No), the result of the calculation of the calculation circuit 62*d* is the time period Ty=T2+nTc. The output circuit 63*d* outputs the signal Von, based on the signal Smd2 and the result of the calculation of the calculation circuit 62*d* (S59).

As described above, in the power factor correction IC 35*d* as well, in both the case where the resonance phenomenon occurs and the case where the conduction phenomenon occurs, the NMOS transistor 36 can be driven at the timing at which the voltage Vds reaches the minimum value. Accordingly, the power factor correction IC 35*d* can reduce the switching loss in the AC-DC converter 10*c*.

===Summary===

Hereinabove, the AC-DC converters 10*b*, 10*c* and the power factor correction ICs 35*a* to 35*d* according to embodiments of the present disclosure have been described.

In the power factor correction ICs 35*a* to 35*d*, to reduce the switching loss of the NMOS transistor 36, the NMOS transistor 36 is turned on, after a lapse of the conduction period of the body diode 37 since the inductor current IL has reached substantially zero after the NMOS transistor 36 is turned off. According to the above configuration, it is possible to turn on the NMOS transistor 36 at the timing at which the drain-source voltage Vds of the NMOS transistor 36 reaches the minimum value, even when the conduction phenomenon occurs. This can reduce switching loss of the NMOS transistor 36 in the AC-DC converter 10*b*.

Further, the signal output circuit 56*a* in the power factor correction IC 35*a* includes: the zero current detection circuit 61*a* configured to detect that the inductor current IL has reached substantially zero after the NMOS transistor 36 is turned off; the calculation circuit 62*a* configured to calculate the time period T1, based on the feedback voltage Vfb, the voltage Vrdiv corresponding to the rectified voltage Vr, and the resonant period Tc of the inductor current; and the output circuit 63*a* configured to output the signal Von, after a lapse of the time period T1 since the inductor current IL has reached substantially zero.

This makes it possible to calculate the on timing of the NMOS transistor 36 that is based on the conduction period of the body diode 37, based on the feedback voltage Vfb and the rectified voltage Vr, thereby being able to reduce the switching loss.

Further, the power factor correction IC 35*a* further includes the first control circuit 54 configured to operate the calculation circuit 62*a* in the first mode or the second mode, and the calculation circuit 62*a* is configured to calculate the first time period T1, when in the first mode, and calculate the time period T2 corresponding to the time period Tc, when in the second mode. Further, the output circuit 63*a* is configured to output the signal Von, after a lapse of the time period Tdelay calculated by the calculation circuit 62*a*, since the inductor current IL has reached substantially zero.

This enables the power factor correction IC 35*a* to turn on the NMOS transistor 36 at the timing at which the voltage Vds reaches the minimum value, even in both the case where the conduction phenomenon of the body diode 37 occurs and the case where the resonance phenomenon occurs, based on the feedback voltage Vfb and the rectified voltage Vr. Accordingly, the switching loss of the NMOS transistor 36 can be reduced.

Further, the first control circuit 54 is configured to operate the calculation circuit 62a in the first mode, when the rectified voltage Vr is lower than ½ times the output voltage Vout, and operate the calculation circuit 62a in the second mode, when the rectified voltage Vr is higher than ½ times the output voltage Vout.

This enables the first control circuit 54 to determine whether the conduction phenomenon is occurring or the resonance phenomenon is occurring, according to Determination principle 1.

Further, the power factor correction IC 35b further includes the second control circuit 70 configured to operate the output circuit 63b in the first mode or the second mode, and the calculation circuit 62b is configured to calculate the time period T1 and the time period T2, and the output circuit 63b is configured to output the signal Von, after a lapse of the time period T1 since the inductor current has reached substantially zero, when in the first mode, and output the signal Von, after a lapse of the time period T2 since the inductor current has reached substantially zero, when in the second mode.

This enables the power factor correction IC 35b to turn on the NMOS transistor 36 at the timing at which the voltage Vds has reached the minimum value, based on the conduction period of the body diode 37 based on Determination principle 3 and Calculation principle 2. Accordingly, the power factor correction IC 35c can reduce the switching loss.

Further, the second control circuit 70 is configured to operate the output circuit 63b in the first mode, when the time period T1 and the time period T2 satisfy Expression (7) of Determination principle 3, and operate the output circuit 63b in the second mode, when the time period T1 and the time period T2 do not satisfy Expression (7).

This enables the second control circuit 70 to determine whether the conduction phenomenon is occurring or the resonance phenomenon is occurring, according to Determination principle 3.

Further, the signal output circuit 56c includes: the zero current detection circuit 61c configured to detect that the inductor current IL has reached substantially zero after the NMOS transistor 36 is turned off; the calculation circuit 62c configured to calculate the first time period T1, based on the time period Ton of from when the driver circuit 60 turns on the NMOS transistor 36 to when the driver circuit 60 turns off the NMOS transistor 36, the time period Tcrs of from when the NMOS transistor 36 is turned off to when the inductor current IL reaches substantially zero, and the resonant period Tc of the inductor current IL; and the output circuit 63c configured to output the signal Von after a lapse of the time period T1 since the inductor current IL has reached substantially zero.

This enables the power factor correction IC 35c to turn on the NMOS transistor 36 at the timing at which the voltage Vds has reached the minimum value, based on the conduction period of the body diode 37. Accordingly, the power factor correction IC 35c can reduce the switching loss.

Further, the power factor correction IC 35c further includes the first control circuit 82 configured to operate the calculation circuit 62c in the first mode or the second mode, and the calculation circuit 62c is configured to calculate the time period T1, when in the first mode, and calculate the time period T2, when in the second mode, and the output circuit 63c is configured to output the signal Von, after a lapse of the time period Tdelay calculated by the calculation circuit 62c since the inductor current IL has reached substantially zero.

This makes it possible to turn on the NMOS transistor 36 at the timing at which the voltage Vds has reached the minimum value, even in both the case where the conduction phenomenon is occurring and the case where the resonance phenomenon is occurring, based on Calculation principle 2, without directly detecting the voltage Vrdiv that is based on the rectified voltage Vr. Accordingly, the power factor correction IC 35c can reduce the switching loss.

The first control circuit 82 is configured to operate the calculation circuit 62c in the first mode, when the rate based on the time period Ton and the time period Tcrs is smaller than ½, and operate the calculation circuit 62c in the second mode, when the rate is larger than ½.

This makes it possible to determine whether the conduction phenomenon is occurring or the resonance phenomenon is occurring, based on Determination principle 2, without directly detecting the voltage Vrdiv that is based on the rectified voltage Vr.

The power factor correction IC 35d further includes the second control circuit 70 configured to operate the output circuit 63d in the first mode or the second mode, and the calculation circuit 62d is configured to calculate the time period T1 and the time period T2, and the output circuit 63d is configured to output the signal Von, after a lapse of the time period T1 since the inductor current IL has reached substantially zero, when in the first mode, and output the signal Von, after a lapse of the time period T2 since the inductor current IL has reached substantially zero, when in the second mode.

Accordingly, the power factor correction IC 35d can also reduce the switching loss of the NMOS transistor 36.

Further, the power factor correction ICs 35a to 35d each further include the frequency detection circuit 59 configured to detect the switching frequency Freq of the NMOS transistor 36, the signal output circuits 56a to 56d each are configured to output the signal Von, after a lapse of the time period T1+nTc, T2+nTc longer than the time period T1, T2, when the switching frequency Freq is higher than the threshold value fth.

Accordingly, by setting n to an appropriate value, it is possible to maintain the switching frequency Freq equal to or smaller than a constant value, thereby being able to reduce the switching loss.

Further, the AC-DC converter 10b, 10c including the power factor correction IC 35a, 35b, 35c, 35d is provided. Accordingly, the AC-DC converter 10b, 10c, which is a power supply circuit in which the switching loss is reduced, is provided.

The present disclosure is directed to provision of a switching control circuit and a power supply circuit that are capable of reducing the switching loss of a power supply circuit.

It is possible to provide a switching control circuit and a power supply circuit that are capable of reducing the switching loss of a power supply circuit.

Hereinabove, the present disclosure has been described using embodiments. However, the technical scope of the present disclosure is not limited to the range described in above embodiments. It is apparent to those skilled in the art that above embodiments can be variously altered and modified. It is apparent from the claims that the technical scope of the present disclosure includes such altered or modified modes and equivalents thereof without departing from its essential features of the present disclosure.

It should be noted that the operations, procedures, steps, stages, and the like in each process in a device, a system, a program, and a method described in the claims, the specification, and the drawings may be performed in any order, unless a term such as "before", "prior to" or the like is explicitly used or an output of a previous process is used in a subsequent process. Even if terms such as "first", "next", and/or the like is used, for convenience, with respect to an operation flow in the claims, the specification, and the drawings, this does not mean that the flow needs to be performed in that order.

What is claimed is:

1. A switching control circuit for a power supply circuit that includes
   an inductor configured to receive a rectified voltage corresponding to an alternating current (AC) voltage, and
   a transistor configured to control an inductor current flowing through the inductor,
the power supply circuit being configured to generate an output voltage of a target level from the AC voltage, the switching control circuit being configured to switch the transistor, the switching control circuit comprising:
   a signal output circuit configured to output a signal to turn on the transistor, after lapse of a first time period since the inductor current reaches a first predetermined value after the transistor is turned off, the first time period corresponding to a conduction period during which a parasitic diode of the transistor conducts; and
   a driver circuit configured to
   turn on the transistor, based on the signal outputted from the signal output circuit, and
   turn off the transistor, based on a feedback voltage corresponding to the output voltage, wherein
   the signal output circuit includes a calculation circuit configured to calculate the first time period, based on the feedback voltage, a voltage corresponding to the rectified voltage, and a resonant period of the inductor.

2. The switching control circuit according to claim 1, wherein the signal output circuit includes
   a detection circuit configured to detect that the inductor current reaches the first predetermined value after the transistor is turned off,
   an output circuit configured to output the signal, after lapse of the calculated first time period since the inductor current reaches the first predetermined value.

3. The switching control circuit according to claim 2, further comprising:
   a first control circuit configured to operate the calculation circuit in a first mode or a second mode, wherein
   the calculation circuit is configured to
     calculate the first time period in the first mode, and
     calculate a second time period, corresponding to the resonant period of the inductor, in the second mode, and
   the output circuit is configured to output the signal, after lapse of the first or second time period calculated by the calculation circuit since the inductor current reaches the first predetermined value.

4. The switching control circuit according to claim 3, wherein the first control circuit is configured to
   operate the calculation circuit in the first mode, when the rectified voltage is lower than ½ times the output voltage, and
   operate the calculation circuit in the second mode, when the rectified voltage is higher than ½ times the output voltage.

5. The switching control circuit according to claim 2, further comprising:
   a control circuit configured to operate the output circuit in a first mode or a second mode, wherein
   the calculation circuit is configured to calculate the first time period and a second time period corresponding to the resonant period of the inductor, and
   the output circuit is configured to
     output the signal, after lapse of the first time period since the inductor current reaches the first predetermined value, in the first mode, and
     output the signal, after lapse of the second time period since the inductor current reaches the first predetermined value, in the second mode.

6. The switching control circuit according to claim 5, wherein the control circuit is configured to
   operate the output circuit in the first mode, when the first time period and the second time period satisfy a predetermined condition, and
   operate the output circuit in the second mode, when the first time period and the second time period do not satisfy the predetermined condition.

7. The switching control circuit according to claim 2, further comprising:
   a frequency detection circuit configured to detect a switching frequency of the transistor, wherein
   the signal output circuit is configured to output the signal after lapse of a time period longer than the calculated time period, when the switching frequency is higher than another predetermined value.

8. A switching control circuit, for a power supply circuit that includes
   an inductor configured to receive a rectified voltage corresponding to an alternating current (AC) voltage, and
   a transistor configured to control an inductor current flowing through the inductor,
the power supply circuit being configured to generate an output voltage of a target level from the AC voltage, the switching control circuit being configured to switch the transistor, the switching control circuit comprising:
   a signal output circuit configured to output a signal to turn on the transistor, after lapse of a first time period since the inductor current reaches a first predetermined value after the transistor is turned off, the first time period corresponding to a conduction period during which a parasitic diode of the transistor conducts; and
   a driver circuit configured to
   turn on the transistor, based on the signal outputted from the signal output circuit, and
   turn off the transistor, based on a feedback voltage corresponding to the output voltage; wherein
   the signal output circuit includes
   a detection circuit configured to detect that the inductor current reaches the first predetermined value after the transistor is turned off,
   a calculation circuit configured to calculate the first time period, based on
     an on period from when the driver circuit turns on the transistor to when the driver circuit turns off the transistor,
     a time period from when the transistor is turned off to when the inductor current reaches the first predetermined value, and
     a resonant period of the inductor, and an output circuit configured to output the signal, after lapse of the calculated first time period since the inductor current reaches the first predetermined value.

9. The switching control circuit according to claim 8, further comprising:
a first control circuit configured to operate the calculation circuit in a first mode or a second mode, wherein
the calculation circuit is configured to
calculate the first time period in the first mode, and
calculate a second time period, corresponding to the resonant period of the inductor, in the second mode, and
the output circuit is configured to output the signal, after lapse of the first or second time period calculated by the calculation circuit since the inductor current reaches the first predetermined value.

10. The switching control circuit according to claim 9, wherein the first control circuit is configured to
operate the calculation circuit in the first mode, when a rate based on the on period and the time period from when the transistor is turned off to when the inductor current reaches the first predetermined value is smaller than a second predetermined value, and
operate the calculation circuit in the second mode, when the rate is larger than the second predetermined value.

11. The switching control circuit according to claim 8, further comprising:
a control circuit configured to operate the output circuit in a first mode or a second mode, wherein
the calculation circuit is configured to calculate the first time period and a second time period corresponding to the resonant period of the inductor, and
the output circuit is configured to
output the signal, after lapse of the first time period since the inductor current reaches the first predetermined value, in the first mode, and
output the signal, after lapse of the second time period since the inductor current reaches the first predetermined value, in the second mode.

12. The switching control circuit according to claim 11, wherein the control circuit is configured to
operate the output circuit in the first mode, when the first time period and the second time period satisfy a predetermined condition, and
operate the output circuit in the second mode, when the first time period and the second time period do not satisfy the predetermined condition.

13. A power supply circuit configured to generate an output voltage of a target level from an alternating current (AC) voltage, the power supply circuit comprising:
an inductor configured to receive a rectified voltage corresponding to the AC voltage;
a transistor configured to control an inductor current flowing through the inductor; and
a switching control circuit configured to switch the transistor, the switching control circuit including
a signal output circuit configured to output a signal to turn on the transistor, after lapse of a first time period since the inductor current reaches a first predetermined value after the transistor is turned off, the first time period corresponding to a conduction period during which a parasitic diode of the transistor conducts; and
a driver circuit configured to
turn on the transistor, based on the signal outputted from the signal output circuit, and
turn off the transistor, based on a feedback voltage corresponding to the output voltage, wherein
the signal output circuit includes a calculation circuit configured to calculate the first time period, based on the feedback voltage, a voltage corresponding to the rectified voltage, and a resonant period of the inductor.

\* \* \* \* \*